United States Patent
Sverdlov et al.

(10) Patent No.: US 12,476,846 B1
(45) Date of Patent: Nov. 18, 2025

(54) HIGH PERFORMANCE LOW POWER LINK FOR ULTRA-WIDEBAND

(71) Applicant: QUALCOMM Incorporated, San Diego, CA (US)

(72) Inventors: Alexander Sverdlov, Rehovot (IL); Assaf Touboul, Netanya (IL); Michael Levitsky, Rehovot (IL); Daniel Paz, Atlit (IL); Tom Barak, Rehovot (IL)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 18/669,016

(22) Filed: May 20, 2024

(51) Int. Cl.
*H04L 25/02* (2006.01)

(52) U.S. Cl.
CPC ................. *H04L 25/0204* (2013.01)

(58) Field of Classification Search
CPC .................................................. H04L 25/0204
See application file for complete search history.

(56) References Cited

U.S. PATENT DOCUMENTS

2016/0056979 A1\* 2/2016 Berke ............... H04L 25/03146
375/232

\* cited by examiner

*Primary Examiner* — Rahel Guarino
(74) *Attorney, Agent, or Firm* — Holland & Hart LLP

(57) ABSTRACT

Methods, systems, and devices for wireless communications are described. For example, a transmitting device, such as a user equipment (UE) or network entity, may apply a pre-equalization operation and a normalization operation prior to transmitting a signal with an intra-symbol duty cycle. A receiving device (e.g., a UE or network entity) may receive the pre-equalized signal with a relatively low demodulation complexity based on the transmitting device pre-equalizing the signal. Additionally, or alternatively, the transmitting device may transmit an indication of the duty cycle to the receiving device in addition to the signal. The receiving device may divide the signal into streams and process the streams based on the indication of the duty cycle. Splitting the signal into streams and processing the streams to estimate symbols of the signal may support a relatively low demodulator complexity at the receiving device.

20 Claims, 16 Drawing Sheets

HIGH PERFORMANCE LOW POWER LINK FOR ULTRA-WIDEBAND

FIELD OF TECHNOLOGY

The following relates to wireless communications, including high performance low power link for ultra-wideband.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

Some devices, such as a UE or network entity, may transmit and receive messages via ultra-wideband (UWB).

SUMMARY

The systems, methods, and devices of this disclosure each have several innovative aspects, no single one of which is solely responsible for the desirable attributes disclosed herein.

A method for wireless communications by a receiving device is described. The method may include splitting a received signal into a first quantity of signal streams, where the first quantity of signal streams is based on an intra-symbol duty cycle of the received signal, performing a Fourier transform operation on each signal stream of the first quantity of signal streams, and estimating a symbol of the received signal using information from each signal streams of the first quantity of signal streams on which the Fourier transform operation was performed.

A receiving device for wireless communications is described. The receiving device may include one or more memories storing processor executable code, and one or more processors coupled with the one or more memories. The one or more processors may individually or collectively be operable to execute the code to cause the receiving device to split a received signal into a first quantity of signal streams, where the first quantity of signal streams is based on an intra-symbol duty cycle of the received signal, perform a Fourier transform operation on each signal stream of the first quantity of signal streams, and estimate a symbol of the received signal using information from each signal streams of the first quantity of signal streams on which the Fourier transform operation was performed.

Another receiving device for wireless communications is described. The receiving device may include means for splitting a received signal into a first quantity of signal streams, where the first quantity of signal streams is based on an intra-symbol duty cycle of the received signal, means for performing a Fourier transform operation on each signal stream of the first quantity of signal streams, and means for estimating a symbol of the received signal using information from each signal streams of the first quantity of signal streams on which the Fourier transform operation was performed.

A non-transitory computer-readable medium storing code for wireless communications is described. The code may include instructions executable by one or more processors to split a received signal into a first quantity of signal streams, where the first quantity of signal streams is based on an intra-symbol duty cycle of the received signal, perform a Fourier transform operation on each signal stream of the first quantity of signal streams, and estimate a symbol of the received signal using information from each signal streams of the first quantity of signal streams on which the Fourier transform operation was performed.

Some examples of the method, receiving devices, and non-transitory computer-readable medium described herein may further include operations, features, means, or instructions for receiving an indication of the intra-symbol duty cycle of the received signal, the first quantity of signal streams being based on the intra-symbol duty cycle, where splitting the received signal into the first quantity of signal streams may be based on receiving the indication.

Some examples of the method, receiving devices, and non-transitory computer-readable medium described herein may further include operations, features, means, or instructions for decoding the received signal based on estimating one or more symbols using the first quantity of signal streams.

In some examples of the method, receiving devices, and non-transitory computer-readable medium described herein, estimating the symbol may include operations, features, means, or instructions for combining outputs of the Fourier transform operation of each signal stream of the first quantity of signal streams and performing a calculation on the combined outputs using a minimum mean square error (MMSE) estimation process.

In some examples of the method, receiving devices, and non-transitory computer-readable medium described herein, estimating the symbol may include operations, features, means, or instructions for performing a set of calculations on outputs of the Fourier transform operation of each signal stream of the first quantity of signal streams, where a respective calculation uses an MMSE estimation process and corresponds to each output of each Fourier transform operation and combining outputs of the set of calculations, where estimating the symbol may be based on the combined outputs of the set of calculations.

Some examples of the method, receiving devices, and non-transitory computer-readable medium described herein may further include operations, features, means, or instructions for receiving the received signal using a set of multiple ports, where each respective port of the set of multiple ports corresponds to a respective signal stream.

In some examples of the method, receiving devices, and non-transitory computer-readable medium described herein, each signal stream of the first quantity of signal streams may be associated with a respective Fourier transform window.

Some examples of the method, receiving devices, and non-transitory computer-readable medium described herein may further include operations, features, means, or instructions for performing a de-normalization operation on each frequency resource of a set of multiple resources associated with the received signal based on the first quantity of signal streams.

A method for wireless communications by a transmitting device is described. The method may include inserting one or more null values into a signal after each sample of the signal, where a quantity of the one or more null values is according to an intra-symbol duty cycle associated with the signal, performing a pre-equalization operation on the signal after inserting the one or more null values, and transmitting the pre-equalized signal.

A transmitting device for wireless communications is described. The transmitting device may include one or more memories storing processor executable code, and one or more processors coupled with the one or more memories. The one or more processors may individually or collectively be operable to execute the code to cause the transmitting device to insert one or more null values into a signal after each sample of the signal, where a quantity of the one or more null values is according to an intra-symbol duty cycle associated with the signal, perform a pre-equalization operation on the signal after inserting the one or more null values, and transmit the pre-equalized signal.

Another transmitting device for wireless communications is described. The transmitting device may include means for inserting one or more null values into a signal after each sample of the signal, where a quantity of the one or more null values is according to an intra-symbol duty cycle associated with the signal, means for performing a pre-equalization operation on the signal after inserting the one or more null values, and means for transmitting the pre-equalized signal.

A non-transitory computer-readable medium storing code for wireless communications is described. The code may include instructions executable by one or more processors to insert one or more null values into a signal after each sample of the signal, where a quantity of the one or more null values is according to an intra-symbol duty cycle associated with the signal, perform a pre-equalization operation on the signal after inserting the one or more null values, and transmit the pre-equalized signal.

Some examples of the method, transmitting devices, and non-transitory computer-readable medium described herein may further include operations, features, means, or instructions for performing a Fourier transform operation on the signal after inserting the one or more null values, where performing the pre-equalization operation may be based on performing the Fourier transform operation.

Some examples of the method, transmitting devices, and non-transitory computer-readable medium described herein may further include operations, features, means, or instructions for performing a normalization operation to each frequency resource of a set of multiple resources associated with the signal based on performing the pre-equalization operation, where the normalization operation may be based on a power threshold associated with the transmitted signal.

Some examples of the method, transmitting devices, and non-transitory computer-readable medium described herein may further include operations, features, means, or instructions for performing an inverse Fourier transform operation on the pre-equalized signal after performing the pre-equalization operation and applying a cyclic prefix to the pre-equalized signal, where transmitting the pre-equalized signal may be based on performing the inverse Fourier transform operation and applying the cyclic prefix.

In some examples of the method, transmitting devices, and non-transitory computer-readable medium described herein, inserting the one or more null values may include operations, features, means, or instructions for inserting the one or more null values in a frequency domain using frequency-domain repetition, where the one or more null values may be associated with a time domain.

In some examples of the method, transmitting devices, and non-transitory computer-readable medium described herein, the pre-equalized signal may be transmitted across a set of multiple frequency bands.

In some examples of the method, transmitting devices, and non-transitory computer-readable medium described herein, a bandwidth of the set of multiple frequency bands spans at least 500 MHz.

Some examples of the method, transmitting devices, and non-transitory computer-readable medium described herein may further include operations, features, means, or instructions for performing an inverse Fourier transform operation on the signal, where inserting the one or more null values may be based on performing the inverse Fourier transform operation.

Some examples of the method, transmitting devices, and non-transitory computer-readable medium described herein may further include operations, features, means, or instructions for performing a constellation mapping operation on the signal, where inserting the one or more null values may be based on performing the constellation mapping operation.

Some examples of the method, transmitting devices, and non-transitory computer-readable medium described herein may further include operations, features, means, or instructions for performing a rate matching operation on the signal, where inserting the one or more null values may be based on performing the rate matching operation.

Some examples of the method, transmitting devices, and non-transitory computer-readable medium described herein may further include operations, features, means, or instructions for performing a channel encoding operation on the signal, where inserting the one or more null values may be based on performing the channel encoding operation.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

DETAILED DESCRIPTION

Figure 1:
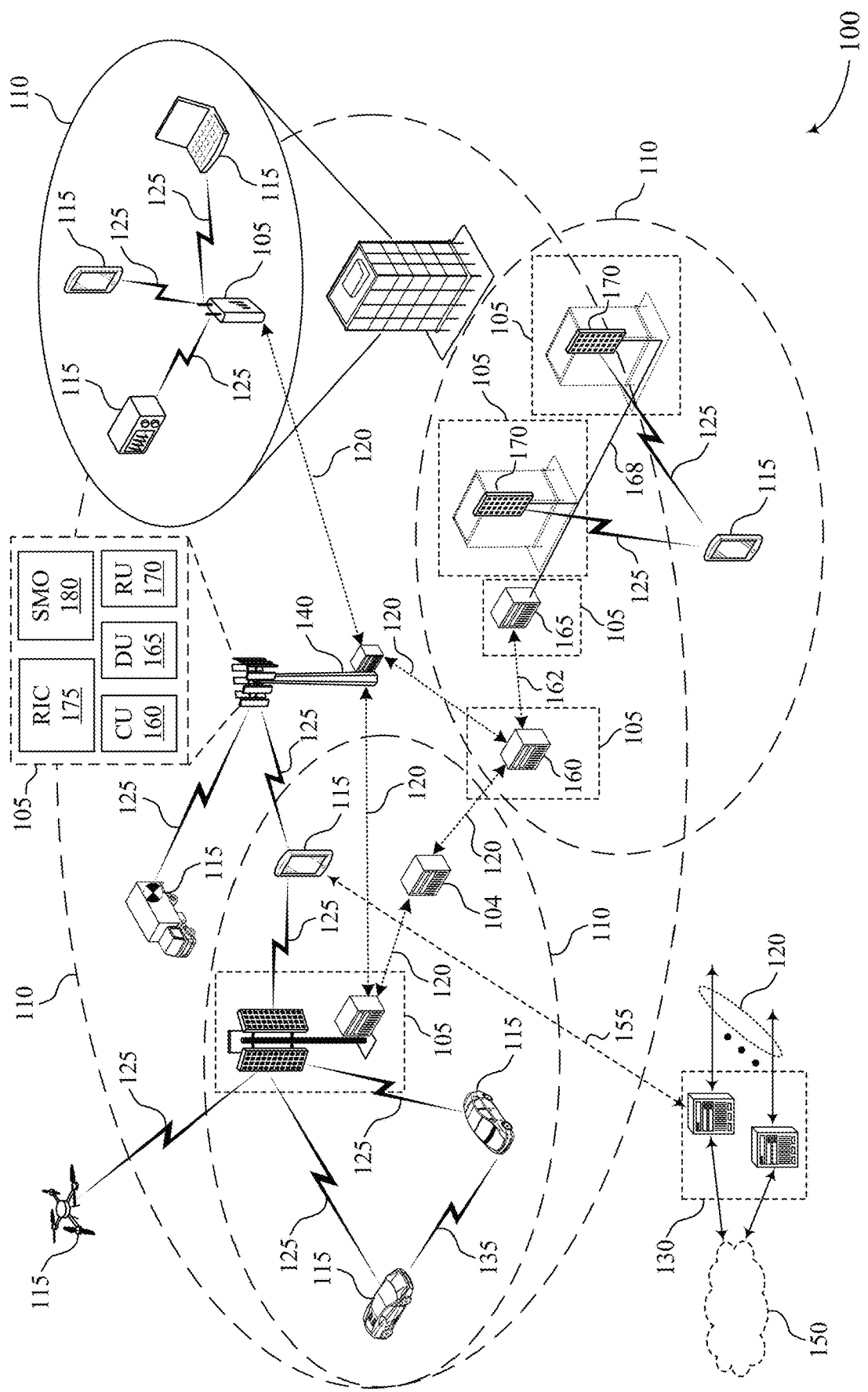
FIGS. 1 and 2 show examples of wireless communications systems that support high performance low power link for ultra-wideband (UWB) in accordance with one or more aspects of the present disclosure.

Some wireless communications systems may communicate messages via ultra-wideband (UWB) transmission. UWB may support relatively high throughput and low-latency communications over short distances compared to other transmission techniques. Some existing UWB waveforms, such as an orthogonal frequency division multiplexing (OFDM) waveform or an impulse radio (IR) waveform, may not support both a high data rate and effective inter-symbol interference (ISI) suppression. For example, an OFDM waveform may support a relatively high-rate link, but may not suppress ISI effectively because of a frequency selectivity associated with the UWB channel. An IR waveform may support effective ISI suppression, but the IR waveform may not support a relatively high-rate link (e.g., the IR waveform may support a robust low-rate link).

To mitigate the frequency selectivity associated with the UWB channel (e.g., suppress ISI), and to support a relatively high throughput link, a waveform with a duty cycle may be used for UWB transmissions. For example, the waveform may be an OFDM waveform. The duty cycle of the OFDM waveform may be an inter-symbol duty cycle (e.g., silent periods between OFDM symbols or packets) or an intra-symbol duty cycle (e.g., silent periods between samples inside the OFDM symbols or packets). The duty cycle OFDM waveform may enhance performance compared to the OFDM waveform or the IR waveform. However, the duty cycle OFDM waveform may also increase a quantity of receive ports at a receiving device, which may result in an increased demodulation complexity and power consumption at the receiving device.

The methods, systems, and techniques described herein may enable a duty cycle OFDM waveform with a relatively low demodulation complexity based on changes to the transmitter chain of the transmitting device and the receiver chain of the receiving device. For example, the transmitting device may apply a pre-equalization operation and a normalization operation prior to transmitting a signal. The receiving device may receive the pre-equalized signal with a relatively low demodulation complexity and a relatively low power consumption based on the transmitting device pre-equalizing the signal. Additionally, or alternatively, the transmitting device may not pre-equalize the signal, but transmit an indication of the duty cycle (e.g., the intra-symbol duty cycle) to the receiving device in addition to the signal. The receiving device may divide the signal into streams and process the streams based on the indication of the duty cycle (e.g., the quantity of streams may correspond to the duty cycle). Splitting the signal into streams and processing the streams to estimate symbols of the signal may support a relatively low demodulator complexity at the receiving device.

Aspects of the disclosure are initially described in the context of wireless communications systems. Aspects of the disclosure are further illustrated by and described with reference to transmitter chains, receiver chains, and a process flow diagram. Aspects of the disclosure are further illustrated by and described with reference to apparatus diagrams, system diagrams, and flowcharts that relate to high performance low power link for ultra-wideband.

FIG. 1 shows an example of a wireless communications system 100 that supports high performance low power link for UWB in accordance with one or more aspects of the present disclosure. The wireless communications system 100 may include one or more devices, such as one or more network devices (e.g., network entities 105), one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via communication link(s) 125 (e.g., a radio frequency (RF) access link). For example, a network entity 105 may support a coverage area 110 (e.g., a geographic coverage area) over which the UEs 115 and the network entity 105 may establish the communication link(s) 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices in the wireless communications system 100 (e.g., other wireless communication devices, including UEs 115 or network entities 105), as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with a core network 130, or with one another, or both. For example, network entities 105 may communicate with the core network 130 via backhaul communication link(s) 120 (e.g., in accordance with an S1, N2, N3, or other interface protocol). In some examples, network entities 105 may communicate with one another via backhaul communication link(s) 120 (e.g., in accordance with an X2, Xn, or other interface protocol) either directly (e.g., directly between network entities 105) or indirectly (e.g., via the core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication link(s) 120, midhaul communication links 162, or fronthaul communication links 168 may be or include one or more wired links (e.g., an electrical link, an optical fiber link) or one or more wireless links (e.g., a radio link, a wireless optical link), among other examples or various combinations thereof. A UE 115 may communicate with the core network 130 via a communication link 155.

One or more of the network entities 105 or network equipment described herein may include or may be referred to as a base station 140 (e.g., a base transceiver station, a radio base station, an NR base station, an access point, a radio transceiver, a NodeB, an eNodeB (eNB), a next-generation NodeB or giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within one network entity (e.g., a network entity 105 or a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among multiple network entities (e.g., network entities 105), such as an integrated access and backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU), such as a CU 160, a distributed unit (DU), such as a DU 165, a radio unit (RU), such as an RU 170, a RAN Intelligent Controller (RIC), such as an RIC 175 (e.g., a Near-Real Time RIC (Near-RT RIC), a Non-Real Time RIC (Non-RT RIC)), a Service Management and Orchestration (SMO) system, such as an SMO system 180, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more of the network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, or any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaptation protocol (SDAP), Packet Data Convergence Protocol (PDCP)). The CU 160 (e.g., one or more CUs) may be connected to a DU 165 (e.g., one or more DUs) or an RU 170 (e.g., one or more RUs), or some combination thereof, and the DUs 165, RUs 170, or both may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or multiple different RUs, such as an RU 170). In some cases, a functional split between a CU 160 and a DU 165 or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to a DU 165 via a midhaul communication link 162 (e.g., F1, F1-c, F1-u), and a DU 165 may be connected to an RU 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities (e.g., one or more of the network entities 105) that are in communication via such communication links.

In some wireless communications systems (e.g., the wireless communications system 100), infrastructure and spectral resources for radio access may support wireless backhaul link capabilities to supplement wired backhaul connections, providing an IAB network architecture (e.g., to a core network 130). In some cases, in an IAB network, one or more of the network entities 105 (e.g., network entities 105 or IAB node(s) 104) may be partially controlled by each other. The IAB node(s) 104 may be referred to as a donor entity or an IAB donor. A DU 165 or an RU 170 may be partially controlled by a CU 160 associated with a network entity 105 or base station 140 (such as a donor network entity or a donor base station). The one or more donor entities (e.g., IAB donors) may be in communication with one or more additional devices (e.g., IAB node(s) 104) via supported access and backhaul links (e.g., backhaul communication link(s) 120). IAB node(s) 104 may include an IAB mobile termination (IAB-MT) controlled (e.g., scheduled) by one or more DUs (e.g., DUs 165) of a coupled IAB donor. An IAB-MT may be equipped with an independent set of antennas for relay of communications with UEs 115 or may share the same antennas (e.g., of an RU 170) of IAB node(s) 104 used for access via the DU 165 of the IAB node(s) 104 (e.g., referred to as virtual IAB-MT (vIAB-MT)). In some examples, the IAB node(s) 104 may include one or more DUs (e.g., DUs 165) that support communication links with additional entities (e.g., IAB node(s) 104, UEs 115) within the relay chain or configuration of the access network (e.g., downstream). In such cases, one or more components of the disaggregated RAN architecture (e.g., the IAB node(s) 104 or components of the IAB node(s) 104) may be configured to operate according to the techniques described herein.

In the case of the techniques described herein applied in the context of a disaggregated RAN architecture, one or more components of the disaggregated RAN architecture may be configured to support test as described herein. For example, some operations described as being performed by a UE 115 or a network entity 105 (e.g., a base station 140) may additionally, or alternatively, be performed by one or more components of the disaggregated RAN architecture (e.g., components such as an IAB node, a DU 165, a CU 160, an RU 170, an RIC 175, an SMO system 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or meters, among other examples.

The UEs 115 described herein may be able to communicate with various types of devices, such as UEs 115 that may sometimes operate as relays, as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via the communication link(s) 125 (e.g., one or more access links) using resources associated with one or more carriers. The term "carrier" may refer to a set of RF spectrum resources having a defined PHY layer structure for supporting the communication link(s) 125. For example, a carrier used for the communication link(s) 125 may include a portion of an RF spectrum band (e.g., a bandwidth part (BWP)) that is operated according to one or more PHY layer channels for a given RAT (e.g., LTE, LTE-A, LTE-A Pro, NR). Each PHY layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities, such as one or more of the network entities 105).

The communication link(s) 125 of the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular RAT (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as OFDM or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems, such as the wireless communications system 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to UEs 115 (e.g., one or more UEs) or may include UE-specific search space sets for sending control information to a UE 115 (e.g., a specific UE).

In some examples, a network entity 105 (e.g., a base station 140, an RU 170) may be movable and therefore provide communication coverage for a moving coverage area, such as the coverage area 110. In some examples, coverage areas 110 (e.g., different coverage areas) associated with different technologies may overlap, but the coverage areas 110 (e.g., different coverage areas) may be supported by the same network entity (e.g., a network entity 105). In some other examples, overlapping coverage areas, such as a coverage area 110, associated with different technologies may be supported by different network entities (e.g., the network entities 105). The wireless communications system 100 may include, for example, a heterogeneous network in which different types of the network entities 105 support communications for coverage areas 110 (e.g., different coverage areas) using the same or different RATs.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs (e.g., one or more of the UEs 115) via a device-to-device (D2D) communication link, such as a D2D communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to one or more of the UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than one hundred kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) RAT, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by a transmitting device (e.g., a network entity 105 or a UE 115) along a single beam direction (e.g., a direction associated with the receiving device, such as another network entity 105 or UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a transmitting device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

UWB may support relatively high throughput, low-latency communication over short distances with relatively low power consumption. Additionally, UWB may support increased location accuracy, and proximity detection, among other examples (e.g., compared to wireless communications systems that do not use UWB). Augmented Reality (AR), Virtual Reality (VR), Mixed Reality (MR), and Extended Reality (XR), applications, as well as wireless display, wireless docking, and wireless audio surround transmissions may implement UWB.

UWB may be transmitted via multiple types of waveforms, such as multiband OFDM (MB-OFDM), direct sequence UWB (DS-UWB), impulse radio UWB (IR-UWB), or frequency modulated UWB (FM-UWB). MB-OFDM may provide frequency diversity over several transmissions and may be used for high-rate links. DS-UWB may be a single carrier waveform with symbol spreading for relatively higher robustness, and may also be used for high-rate links. IR-UWB may suppress inter-symbol interference (ISI) by transmitting short pulses at a relatively small duty cycle and may be used for low-rate robust links. FM-UWB may spread a narrow-band signal into a UWB band greater than or equal to 500 MHz.

In some examples, the OFDM waveform may suppress (e.g., completely suppress) ISI. However, in some cases, the UWB channel's high frequency selectivity may result in log-likelihood ratio (LLR) values with a large spread, which may effectively erase one or more LLRs. To mitigate this effect, OFDM waveforms may be limited to lower coding rates and use relatively powerful channel coding.

The IR waveform, which may have a relatively low duty cycle, may enable effective ISI suppression. The IR waveform may improve post-processing signal-to-noise ratio (ppSNR) using maximum ratio combining (MRC) of multipath components or equalization. IR waveform may support LLRs with the same ppSNR, and the low duty cycle may enable transmissions with a relatively higher power per pulse.

To mitigate the frequency selectivity associated with the UWB channel (e.g., suppress ISI), and to support a relatively high throughput link, a waveform with a duty cycle may be used for UWB transmissions. For example, the waveform may be an OFDM waveform. The duty cycle of the OFDM waveform may be an inter-symbol duty cycle (e.g., silent periods between OFDM symbols or packets) or an intra-symbol duty cycle (e.g., silent periods between samples inside the OFDM symbols or packets). The duty cycle OFDM waveform may enhance performance compared to the OFDM waveform or the IR waveform. However, the duty cycle OFDM waveform may also increase a quantity of receive ports at a receiving device, which may result in an increased demodulation complexity and power consumption at the receiving device.

The methods, systems, and techniques described herein may enable a duty cycle OFDM waveform with a relatively low demodulation complexity based on changes to the transmitter chain of a transmitting device (e.g., such as a UE 115 or a network entity 105) and the receiver chain of a receiving device (e.g., such as a UE 115 or a network entity 105). For example, the transmitting device may apply a pre-equalization operation and a normalization operation prior to transmitting a signal. The receiving device may receive the pre-equalized signal with a relatively low demodulation complexity and a relatively low power consumption based on the transmitting device pre-equalizing the signal. Additionally, or alternatively, the transmitting device may not pre-equalize the signal, but transmit an indication of the duty cycle (e.g., the intra-symbol duty cycle) to the receiving device in addition to the signal. The receiving device may divide the signal into streams and process the streams based on the indication of the duty cycle (e.g., the quantity of streams may correspond to the duty cycle). Splitting the signal into streams and processing the streams to estimate symbols of the signal may support a relatively low demodulator complexity at the receiving device.

Figure 2:
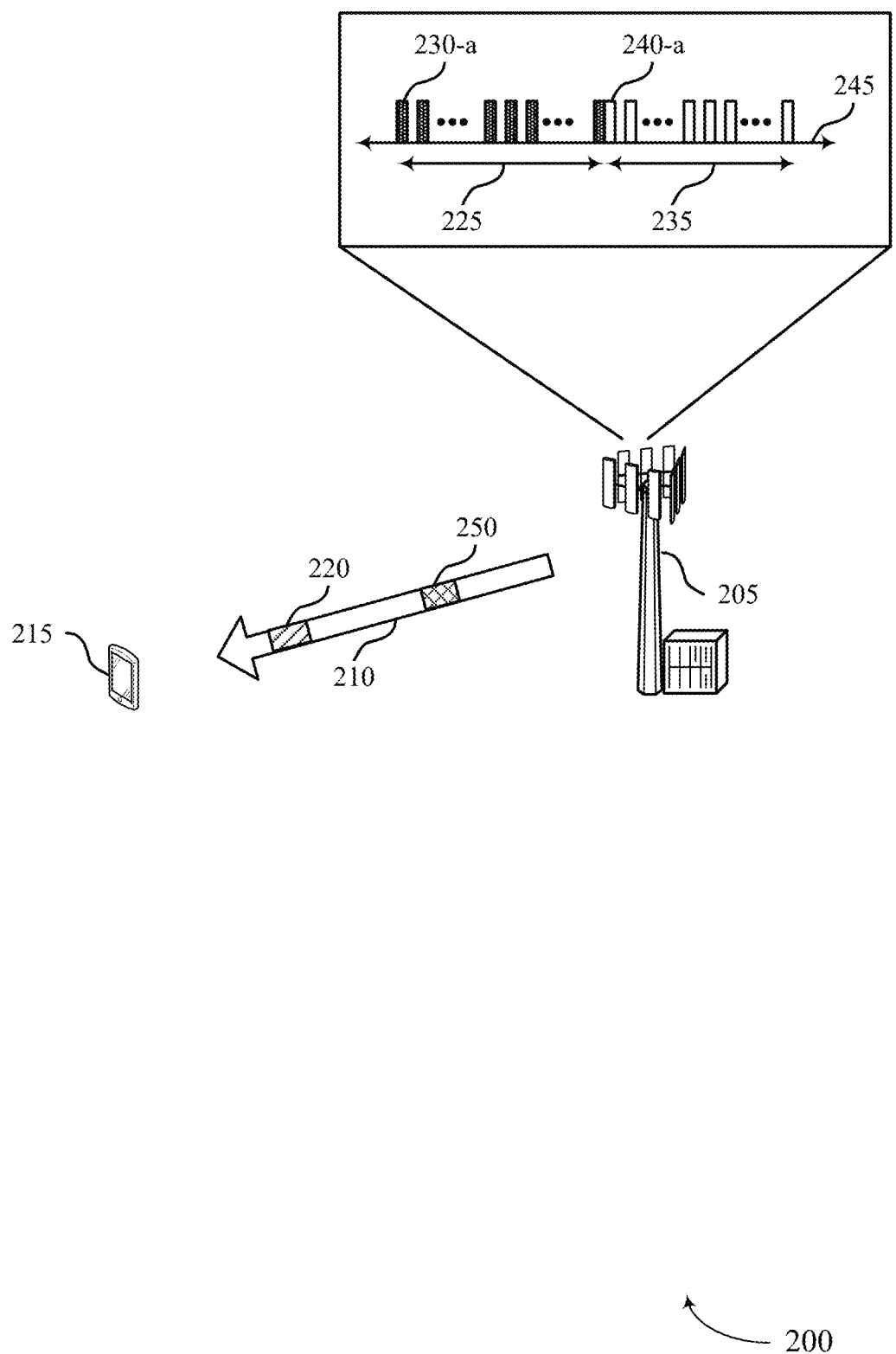

FIG. 2 shows an example of a wireless communications system 200 that supports high performance low power link for UWB in accordance with one or more aspects of the present disclosure. The wireless communications system 200 may include a transmitting device 205 and a receiving device 215. As described herein, the transmitting device 205 may be a network entity 105 or a UE 115. The receiving device 215 may be a network entity 105 or a UE 115. In some examples, a network entity 105 may be substituted for the transmitting device 205 and a UE 115 may be substituted for the receiving device 215. In some examples, a UE 115 may be substituted for the transmitting device 205 and a network entity 105 may be substituted for the receiving device 215. In some examples, a UE 115 may be substituted for the transmitting device 205 and a UE 115 may be substituted for the receiving device 215. In some examples, a network entity 105 may be substituted for the transmitting device 205 and a network entity 105 may be substituted for the receiving device 215. The transmitting device 205 may transmit one or more messages (e.g., downlink messages, uplink messages, and/or sidelink messages) to the receiving device 215 via a UWB channel 210.

For example, the transmitting device 205 may transmit the one or more messages (e.g., downlink message, uplink message, sidelink message) in accordance with a UWB transmission. A UWB transmission may refer to transmission with a bandwidth that is bounded by frequency points, $f_L$ and $f_H$, which may be a quantity of decibels (e.g., 10 dB or −31.3 dBm/MHz) below a highest radiated emission. A central frequency, $f_c$, of a UWB transmission may be between the points $f_L$ and $f_H$. For example, $$f_c = \frac{1}{2}(f_L + f_H),$$

and a fractional bandwidth of the transmission may be $$BW_{frac} = \frac{(f_H - f_L)}{f_c}.$$

A transmission may be a UWB transmission based on an emitted signal bandwidth exceeding the lesser of $(f_H - f_L)$ ≥500 MHz or $BW_{frac}$ ≥20% of the arithmetic center frequency, $f_c$. Additionally, or alternatively, a UWB transmission may be any transmission with a relatively wide bandwidth (e.g., greater than or equal to 500 MHz) transmitted in a frequency range of 3.1 GHz to 10.6 GHz.

In some examples, the transmitting device 205 may transmit a first message 220 to the receiving device 215 via the UWB channel 210. The first message 220 may include a first OFDM symbol 225 and a second OFDM symbol 235. In some examples, the transmitting device 205 may utilize a duty cycle to transmit the one or more messages (e.g., uplink messages, downlink messages, and/or sidelink messages), such as the first message 220. For example, the transmitting device 205 may utilize duty cycle transmission for the UWB channel 210 because a lower duty cycle may increase a transmission power spectral density (PSD), and UWB transmissions may be associated with a low PSD threshold. In some examples, PSD may be inversely proportional to the duty cycle.

The transmitting device 205 may implement a duty cycle for each of the OFDM symbols in the first message 220. For example, the transmitting device 205 may implement an intra-symbol duty cycle for the first OFDM symbol 225 and the second OFDM symbol 235. The intra-symbol duty cycle may refer to a duty cycle within a respective OFDM symbol or packet. For example, the first OFDM symbol may include one or more samples 230-a with silent periods between the respective samples 230-a. Similarly, the second OFDM symbol 235 may include one or more samples 240-a with silent periods between the samples in the second OFDM symbol 235.

The quantity of silent periods during a time 245 may be based on the intra-symbol duty cycle of the first OFDM symbol 225 and the second OFDM symbol 235. In some examples, the intra-symbol duty cycle may enable an increased PSD during an active time of the OFDM symbols (e.g., during the samples 230-a or the samples 240-a) compared to wireless communications systems that do not implement duty cycle transmissions. Intra-symbol duty cycle transmissions may also support additional frequency diversity and performance compared to other duty cycle transmission techniques (e.g., inter-symbol duty cycle transmission).

For example, the transmitting device 205 may insert one or more zero samples (e.g., during the silent periods) into one or more OFDM symbols of the first message 220 in accordance with the intra-symbol duty cycle (e.g., within the first OFDM symbol 225 and the second OFDM symbol 235). In some examples, the receiving device 215 may receive samples from the first OFDM symbol 225, the second OFDM symbol 235, or another OFDM symbol from the first message 220 during the durations of the zero samples. For example, multiple samples from the first message 220 may follow multiple paths to the receiving device 215, and the receiving device 215 may receive the multiple symbols at different times compared to how the transmitting device 205 transmitted the first message 220. For example, the receiving device 215 may receive second OFDM symbol samples 240-a during the initial zero sample durations while receiving the first OFDM symbol samples 230-a.

By inserting the one or more zero samples, the transmitting device 205 may improve the frequency diversity of the first message 220 by increasing a receive diversity order. For example, the inserted zero samples may convert a system $N_{Tx} \times N_R$ to $N_{Tx} \times N_{Rx}/$(duty cycle), where $N_{Tx}$ is a quantity of transmit ports and $N_{Rx}$ is a quantity of receive ports. A port may correspond to one or more antenna ports, one or more receive chains, one or more transmit chains, or any combination thereof.

In a first example, for $N_{Tx}=1$, $N_{Rx}=1$, and a duty cycle=0.5, a system of $1_{Tx} \times 1_{Rx}$ may convert to $1_{Tx} \times 2_{Rx}$ based on the transmitting device 205 inserting the zero samples. In a second example, for $N_{Tx}=2$, $N_{Rx}=2$, and a duty cycle=0.5, a system of $2_{Tx} \times 2_{Rx}$ may convert to $2_{Tx} \times 4_{Rx}$ based on the transmitting device 205 inserting one or more zero samples into the one or more OFDM symbols in accordance with the duty cycle (e.g., the intra-symbol duty cycle). However, increasing the quantity of receive ports may increase demodulation complexity and power consumption at the receiving device 215.

The systems, methods, and techniques described herein may support a relatively high performance link over the UWB channel 210 (e.g., based on OFDM symbol transmission with intra-symbol duty cycle) and relatively low power and demodulation complexity at the receiving device 215. In some examples, the transmitting device 205 may transmit the first message 220 based on performing a pre-equalization operation, as described further with reference to the transmitter chain 300-a of FIG. 3A. In other examples, the transmitting device 205 may transmit the first message 220 without performing the pre-equalization operation, as described with reference to the transmitter chain 400-a in FIG. 4A. In such examples, the transmitting device 205 may transmit a second message 250 (e.g., an uplink message, a downlink message, and/or a sidelink message). The second message 250 may include an indication of the duty cycle. As described with further reference to FIG. 4B, the receiving device 215 may implement a demodulator and estimate the first message 220 based on the demodulator and the indication of the duty cycle included in the second message 250.

Figure 3A:
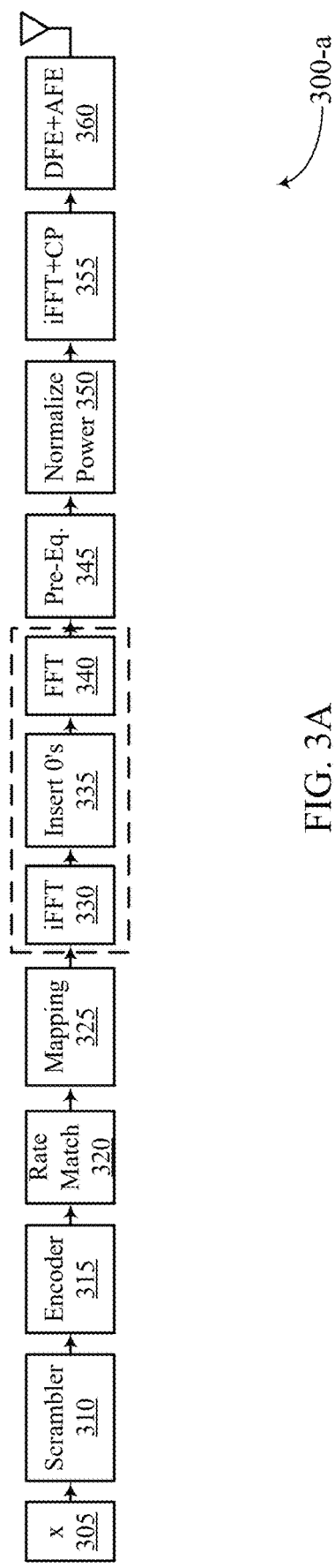
FIGS. 3A and 3B show examples of a transmitter chain associated with pre-equalization and a receiver chain associated with pre-equalization, respectively, that support high performance low power link for UWB in accordance with one or more aspects of the present disclosure.

FIG. 3A shows an example of a transmitter chain 300-a associated with pre-equalization that supports high performance low power link for UWB in accordance with one or more aspects of the present disclosure. For example, the transmitter chain 300-a may be implemented by a transmitting device 205 (e.g., such as a network entity 105 or a UE 115). The transmitter chain 300-a may implement a pre-equalization process to reduce power consumption at a receiving device (e.g., the receiving device 215). In some examples, the transmitter chain 300-a may include a series of processes and operations (e.g., 310-360) that transform an input signal 305 into a format for UWB transmission. The input signal 305 may be input data (e.g., payload data). In some examples, the input signal 305 may be a physical service data unit (PSDU).

The transmitting device may input the input signal 305, x, into a scrambler 310. The scrambler 310 may randomize the data of the input signal 305 using a pseudo-random binary sequence (e.g., to obtain a balanced distribution of logic zeros and ones). In some examples, scrambling the input signal 305 may decrease synchronization errors based on minimizing relatively long sequences of identical bits. After scrambling the input signal 305, the transmitting device may input the scrambled signal into a channel encoder 315.

The channel encoder 315 may encode the scrambled signal according to one or more encoding schemes (e.g., convolutional coding, turbo coding, low-density parity-check (LDPC) coding, and the like). In some examples, encoding the scrambled signal may increase redundancy of the signal and support increased error detection and correction at the receiving device. Based on encoding the scrambled signal, the transmitting device may perform a rate matching process 320 on the encoded signal.

The rate matching process 320 may adjust a data rate of the encoded signal to match a transmission rate of a physical channel (e.g., the UWB channel 210). After rate matching the encoded signal, the transmitting device may input the rate matched signal into a constellation mapping process 325 that maps binary data of the rate matched signal into symbols (e.g., an OFDM symbol) using a constellation diagram. Based on mapping the rate matched signal, the transmitting device may perform an inverse Fourier transform operation 330 to transform the mapped signal from a frequency domain into a time domain (e.g., using an inverse fast Fourier transform (iFFT)).

The transmitting device may insert zeros into the time domain signal (e.g., the signal including one or more OFDM symbols) according to a duty cycle, using an insert zeros process 335. The duty cycle may be an intra-symbol duty cycle. In some examples, zero insertion in the time domain may be implemented by frequency domain repetition in the frequency domain (e.g., to avoid iFFT+FFT). Based on inserting the zeros, the transmitting device may apply a Fourier transform operation 340 (e.g., an FFT) to transform the signal from the time domain to a frequency domain. The size of the signal after inserting the zeros and transforming to the frequency domain may be equal to K·NFFT, where $$K \text{ is } \frac{1}{\text{duty cycle}}$$

and NFFT is a quantity of points associated with the Fourier transform operation 340.

In some examples, the transmitting device may apply a pre-equalization process 345 to the signal with inserted zeros. The pre-equalization process 345 may compensate for distortions the signal may experience during transmission via the UWB channel to the receiving device. In some examples, the transmitting device may apply the pre-equalization process 345 based on an estimation of the channel that the signal will be transmitted on. The channel estimation may be based on measurements performed by the transmitting device, the receiving device, or both.

The transmitting device may normalize the pre-equalized signal using a normalization process 350. The transmitting device may apply the normalization process 350 to each resource element (RE) of the pre-equalized signal to satisfy one or more power thresholds of the UWB channel. Based on normalizing the pre-equalized signal, the transmitting device may transform the normalized signal into the time domain to add a cyclic prefix (CP) to the signal using a cyclic prefix process 355.

The transmitting device may perform additional processing operations using a digital front-end (DFE) and an analog front-end (AFE) operation 360. In some examples, the DFE may perform one or more digital signal processing operations, such as filtering and modulation. Additionally, or alternatively, the AFE may convert the digital signal into an analog signal. Based on performing the processing operations using the DFE and AFE operation 360, the transmitting device may transmit the signal to the receiving device.

Figure 3B:
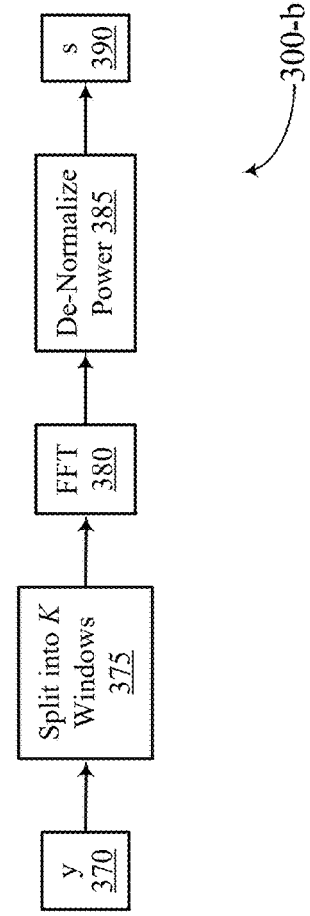

FIG. 3B shows an example of a receiver chain 300-b associated with pre-equalization that supports high performance low power link for UWB in accordance with one or more aspects of the present disclosure. For example, the receiver chain 300-b may be implemented by a receiving device 215 (e.g., such as a network entity 105 or a UE 115) using a demodulator. The receiver chain 300-*b* may be used based on receiving a pre-equalized signal (e.g., transmitted via the transmitter chain 300-*a*). The receiver chain 300-*b* may include a series of processes and operations (e.g., 375-380) to estimate a signal waveform with a duty cycle (e.g., estimate data of a received signal with an intra-symbol duty cycle).

The receiving device may receive an input signal 370, y, which may be the received signal, and input the signal into a signal decimation process 375. In some examples, signal decimation process 375 may split the input signal 370 into K Fourier transform (e.g., FFT) windows. Based on the signal decimation process 375, the receiving device may perform a Fourier transform operation 380 to transform the signal from the time domain to the frequency domain. For example, a respective window may be represented as W=FFT($z_k$), where $z_K$ is the Kth signal stream of the K Fourier transform windows. In some examples, K=0 (e.g., the signal is not split) based on the receiving device receiving a pre-equalized signal, and the window size may be NFFT.

The receiving device may de-normalize the power of the decimated signal per RE of the signal using a de-normalization process 385. In some examples, the receiving device may estimate the input signal 370 based on the signal decimation process 375, the Fourier transform operation 380, and the de-normalization process 385. For example, the estimated signal 390 may be Ŝ=deNorm*W. In some examples, the receiving device may estimate the signal using QAM symbol estimation. Receiving a pre-equalized signal with an intra-symbol duty cycle may improve performance (e.g., ppSNR) compared to other wireless communications systems that do not transmit pre-equalized signals with an intra-symbol duty cycle.

Figure 4A:
FIGS. 4A and 4B show example of a transmitter chain and a receiver chain, respectively, that support high performance low power link for UWB in accordance with one or more aspects of the present disclosure.

FIG. 4A shows an example of a transmitter chain 400-*a* that supports high performance low power link for UWB in accordance with one or more aspects of the present disclosure. For example, the transmitter chain 400-*a* may be implemented by a transmitting device 205 (e.g., such as a network entity 105 or a UE 115). The transmitting device may transmit an indication of a duty cycle (e.g., the second message 250) based on the transmitter chain 400-*a*. The transmitter chain 400-*a* may include a series of processes and operations (e.g., 410-450) that transform an input signal 405 into a format for UWB transmission. The input signal 405 may be input data (e.g., payload data). In some examples, the input signal 405 may be a PSDU.

The transmitting device may input the input signal 405, x, into a scrambler 410. The scrambler 410 may randomize the data of the input signal 405 using a pseudo-random binary sequence (e.g., to obtain a balanced distribution of logic zeros and ones). In some examples, scrambling the input signal 405 may decrease synchronization errors based on minimizing relatively long sequences of identical bits. After scrambling the input signal 405, the transmitting device may input the scrambled signal into a channel encoder 415.

The channel encoder 415 may encode the scrambled signal according to one or more encoding schemes (e.g., convolutional coding, turbo coding, LDPC coding, and the like). In some examples, encoding the scrambled signal may support increased error detection and correction at the receiving device. Based on encoding the scrambled signal, the transmitting device may perform a rate matching process 420 on the encoded signal.

The rate matching process 420 may adjust a data rate of the encoded signal to match a transmission rate of a physical channel (e.g., the UWB channel 210). After rate matching the encoded signal, the transmitting device may input the rate matched signal into a constellation mapping process 425 that maps binary data of the input signal into symbols (e.g., an OFDM symbol) using a constellation diagram. Based on mapping the rate matched signal, the transmitting device may perform an inverse Fourier transform operation to transform the mapped signal from a frequency domain into a time domain (e.g., via an iFFT) to add a cyclic prefix to the signal using the cyclic prefix process 430.

The transmitting device may insert zeros into the time domain signal (e.g., the signal including one or more OFDM symbols) according to a duty cycle, using an insert zeros process 435. The duty cycle may be an intra-symbol duty cycle. In some examples, the duty cycle may be pre-defined (e.g., 1, ½, ⅓). For example, the transmitting device may insert two zero samples after each OFDM sample based on a ⅓ duty cycle. In another example, the transmitting device may insert a zero sample after each OFDM sample based on a ½ duty cycle.

Based on inserting the zeros, the transmitting device may perform additional processing operations using a DFE and an AFE operation 450. In some examples, the DFE may perform one or more digital signal processing operations, such as filtering and modulation. Additionally, or alternatively, the AFE may convert the digital signal into an analog signal. Based on performing the processing operations using the DFE and the AFE operation 450, the transmitting device may transmit the signal to the receiving device. In some examples, the transmitting device may transmit an indication of the duty cycle used in the insert zeros process 435.

Figure 4B:
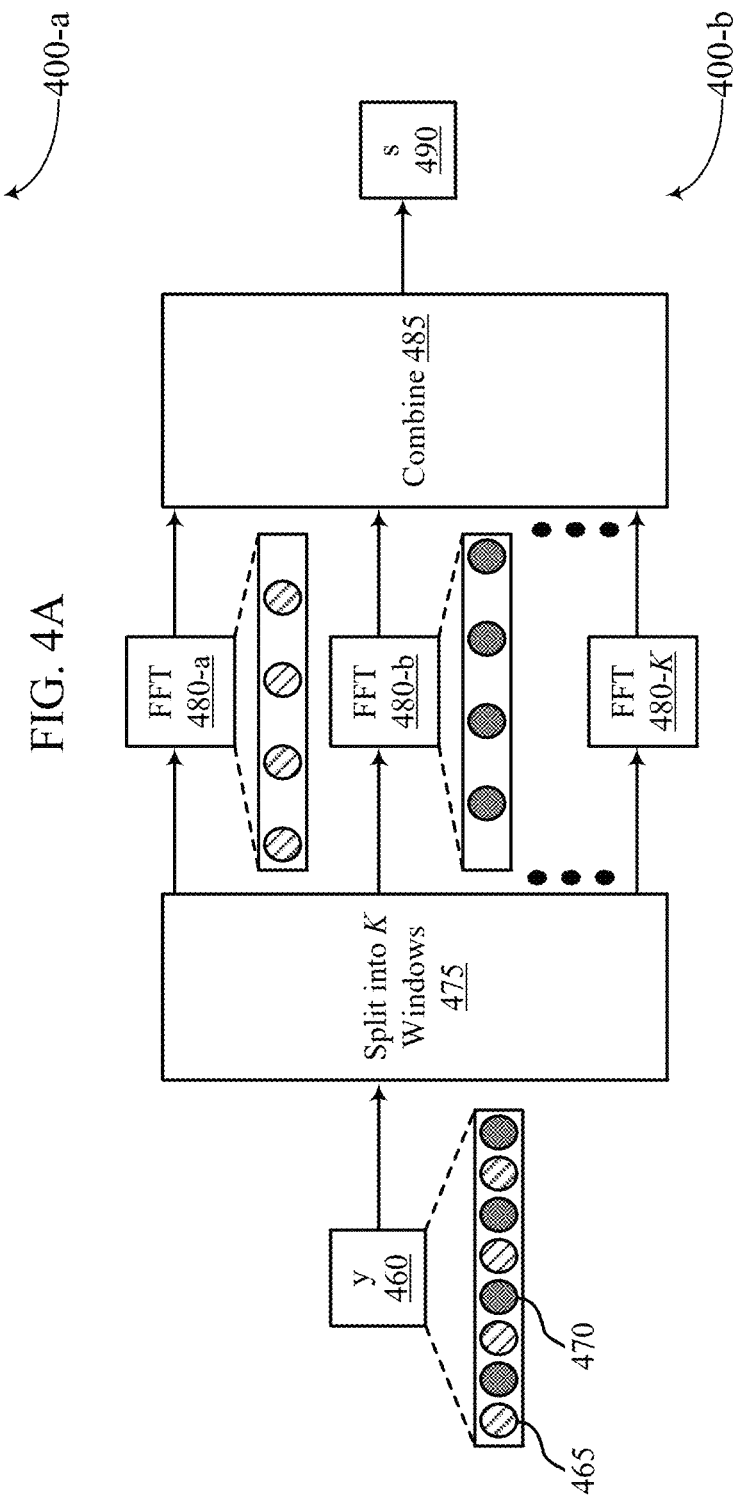

FIG. 4B shows an example of a receiver chain 400-*b* that supports high performance low power link for UWB in accordance with one or more aspects of the present disclosure. For example, the receiver chain 400-*b* may be implemented by a receiving device 215 (e.g., such as a network entity 105 or a UE 115) using a demodulator. The receiver chain 400-*b* may include a series of processes and operations (e.g., 475-480) to estimate a signal waveform with a duty cycle (e.g., estimate data of a received signal with an intra-symbol duty cycle). In some examples, the estimated signal waveform may be based on the series of processes and operations as well as an indication of the duty cycle. For example, the receiving device may receive an indication of the duty cycle to support the estimation of the signal waveform.

The receiving device may receive an input signal 460, y, which may be the received signal, and an indication of the duty cycle (e.g., the second message 250). The input signal 460 may include one or more first samples 465 and one or more second samples 470. In some examples, the one or more first samples 465 may correspond to one or more samples transmitted by the transmitting device and the one or more second samples 470 may correspond to one or more zero samples inserted into the received signal. For example, the receiving device may receive one or more second samples 470 (e.g., samples received via multipath) during a respective duration of a zero sample transmitted by the transmitting device. FIG. 4B illustrates an exemplary receiver chain where the received signal was transmitted with a duty cycle of ½ (e.g., every other sample was a zero sample). However, any duty cycle value may be used for the receiver chain 400-*b*.

The receiving device may split the input signal 460 into K Fourier transform windows (e.g., into K signal streams) in a signal decimation process 475. The receiving device may divide the received signal into K windows according to the duty cycle, where $$K = \frac{1}{\text{duty cycle}},$$

and k=0:K−1. The decimated signal, y[n], may be equal to $z_k[i]=y[k+K·i]$, and the decimated channel impulse response, $h_k[i]$, may be equal to h[k+K·i]. In some examples, $z_k[i]=\Sigma_m$ h[l−m]·x[m], where l=i·K+k and m=K·n. When l and m are substituted to solve for $z_k[i]$, the relationship may be simplified to $z_k[i]=\Sigma_n$ h[(i−n)·K+k]·s[n]=$\Sigma_n$ $h_k[i−n]$·s[n].

The receiving device may perform a Fourier transform operation 480 (e.g., an FFT) for each window, k using one or more Fourier transform operations 480-K. For example, $H_k$=FFT($h_k$) and $Z_k$=FFT($z_k$). In the example of a ½ duty cycle, the receiving device may split the input signal 460 into two signal streams and perform a Fourier transform operation 480-a and a Fourier transform operation 480-b on each signal stream. The first stream and Fourier transform operation 480-a may correspond to the one or more first samples 465 and the second stream and Fourier transform operation 480-b may correspond to the one or more second samples 470.

The receiving device may utilize the multiple Fourier transform windows as multiple receive ports (e.g., receive chains). For example, the frequency domain channel response, H, may be equal to [$H_0 H_1$ ... ]=[$N_{Tx} \times N_{Rx}$·K], and the frequency domain signal, Z, may be equal to [$Z_0 Z_1$ ... ]=[$N_{Tx} \times N_{Rx}$·K]. The receiving device may combine the Fourier windows (e.g., signal streams) to estimate the received signal using a combination process 485. In some examples, the combination process 485 may be associated with the combined channel response (e.g., combined H). Based on combining the signal streams, the receiving device may use an estimation method to minimize the mean square error (MMSE) of the combined signal streams. Additionally, or alternatively, the receiving device may perform separate a MMSE estimation k times and combine the equalized outputs using the combination process 485.

Based on the combination process 485, the receiving device may estimate the symbols of the received signal per RE, where Z=H·S+V, and the estimated signal 490, may be Ŝ=($H^H·R_{nn}^{-1}·H+1)^{-1}·H^H·R_{nn}^{-1}$·Z. Based on splitting the signal into streams and processing the streams according to the indication of the duty cycle, the receiver chain 400-b may support a relatively low demodulator complexity at the receiving device.

Figure 5:
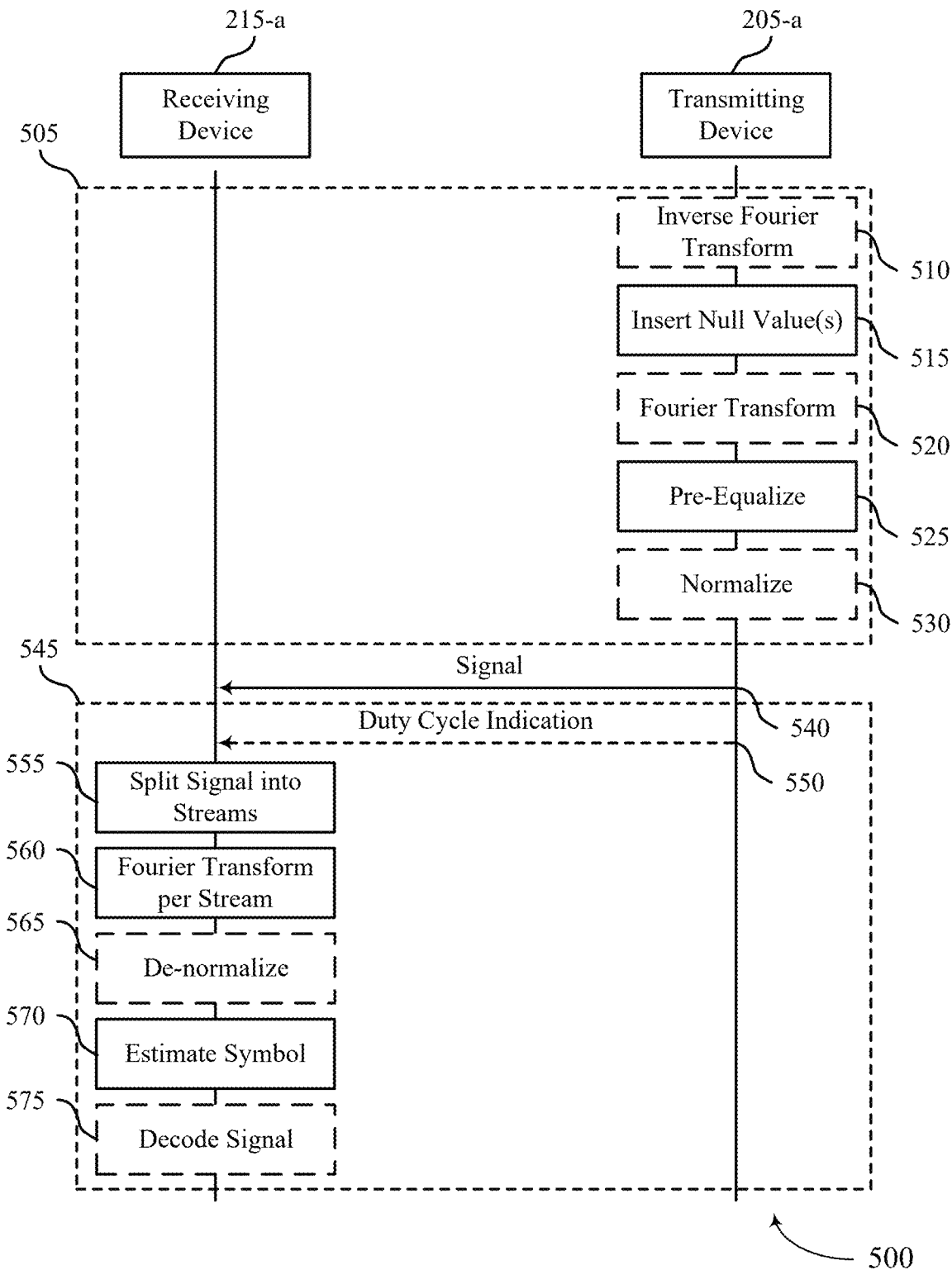
FIG. 5 shows an example of a process flow that supports high performance low power link for UWB in accordance with one or more aspects of the present disclosure.

FIG. 5 shows an example of a process flow 500 that supports high performance low power link for UWB in accordance with one or more aspects of the present disclosure. The process flow 500 may be implemented by aspects of the wireless communications system 100 and 200. For example, a receiving device 215-a and a transmitting device 205-a, which may be examples of a receiving device 215 and a transmitting device 205 (e.g., where each may be a UE 115 or a network entity 105) as described herein, may perform aspects of the process flow 500. In the following description of the process flow 500, operations performed by the receiving device 215-a and the transmitting device 205-a may be performed in a different order than is shown. Some operations may be omitted from the process flow 500, and other operations may be added to the process flow 500. Further, although some operations or signaling may be shown to occur at different times for discussion purposes, these operations may occur at the same time.

In some examples, at 505, the transmitting device 205-a may perform one or more operations based on pre-equalizing a signal for transmission to the receiving device 215-a. The operations at 505 may correspond to the operations and processes in the transmitter chain 300-a. For example, at 510, the transmitting device 205-a may perform an inverse Fourier transform operation on a signal. In some examples not illustrated in the process flow 500, the transmitting device 205-a may perform a channel encoding operation, a rate matching operation, and a constellation mapping on the signal (e.g., prior to the inverse Fourier transform operation).

At 515, the transmitting device 205-a may insert one or more null values into the signal after each sample of the signal (e.g., the signal may include multiple symbols that each include multiple samples). The transmitting device 205-a may insert the one or more null values in a frequency domain using frequency-domain repetition, where the one or more null values are associated with a time domain. In some examples, a quantity of the one or more null values may be according to an intra-symbol duty cycle associated with the signal. The transmitting device may insert the one or more null values based on performing the channel encoding, the rate matching, the constellation mapping, the inverse Fourier transform, or any combination thereof. In some examples, at 520, the transmitting device 205-a may perform a Fourier transform operation on the signal after inserting the one or more null values.

At 525, the transmitting device 205-a may perform a pre-equalization operation on the signal after inserting the one or more null values. In some examples, at 530, the transmitting device 205-a may perform a normalization operation to each frequency resource of multiple resources (e.g., for each RE of the signal) based on performing the pre-equalization operation. The normalization operation may be based on a power threshold associated with the transmitted signal (e.g., the transmitting device 205-a may normalize the frequency resources based on UWB transmission power thresholds).

The transmitting device 205-a may perform an inverse Fourier transform on the pre-equalized signal after performing the pre-equalization operation (e.g., and after performing the normalization operation). In some examples, the transmitting device 205-a may apply a cyclic prefix to the pre-equalized signal.

At 540, the transmitting device 205-a may transmit the signal (e.g., the pre-equalized signal). In some examples, the transmitting device 205-a may transmit the signal based on performing the inverse Fourier transform operation and applying the cyclic prefix. In some examples, the transmitting device 205-a may transmit the signal across a plurality of frequency bands. In some cases, a bandwidth of the plurality of frequency bands may span at least 500 MHz.

In some examples, at 545, the receiving device 215-a may perform one or more operations based receiving a signal (e.g., not pre-equalized) from the transmitting device 205-a. The operations at 545 may correspond to the operations and processes in the receiver chain 400-b. For example, at 550, the transmitting device 205-a may receive an indication of an intra-symbol duty cycle of the received signal. In some examples, the receiving device 215-a may receive the signal using multiple ports.

At 555, the receiving device 215-a may split the received signal into a first quantity of signal streams. In some examples, each signal stream of the first quantity of signal streams may be associated with a respective Fourier transform window, and a respective signal stream may also correspond to a respective port of the multiple ports that received the signal. The first quantity of signal streams may be based on the intra-symbol duty cycle of the received signal. For example, the receiving device 215-*a* may split the received signal into the first quantity of signal streams based on receiving the indication of the intra-symbol duty cycle.

At 560, the receiving device 215-*a* may perform a Fourier transform operation on each signal stream of the first quantity of signal streams. At 565, the receiving device 215-*a* may perform a de-normalization operation on each frequency resource of multiple resources associated with the received signal based on the first quantity of signal streams (e.g., if there is 1 signal stream, the receiving device 215-*a* may perform the de-normalization operation).

At 570, the receiving device 215-*a* may estimate a symbol of the received signal using information from each signal stream of the first quantity of signal streams on which the Fourier transform operation was performed. In some examples, the receiving device 215-*a* may estimate the symbol based on combining outputs of the Fourier transform operation of each signal stream of the first quantity of signal steams and performing a calculation on the combined outputs using an MMSE estimation process.

Additionally, or alternatively, the receiving device 215-*a* may estimate the symbol based on performing a set of calculations on outputs of the Fourier transform operation of each signal stream of the first quantity of signal streams and combining outputs of the set of calculations. A respective calculation may use an MMSE estimation process and correspond to each output of each Fourier transform operation. Based on the combined outputs of the set of calculations, the receiving device 215-*a* may estimate the symbol. In some examples, at 575, the receiving device 215-*a* may decode the received signal based on estimating one or more symbols using the first quantity of signal streams.

Figure 6:
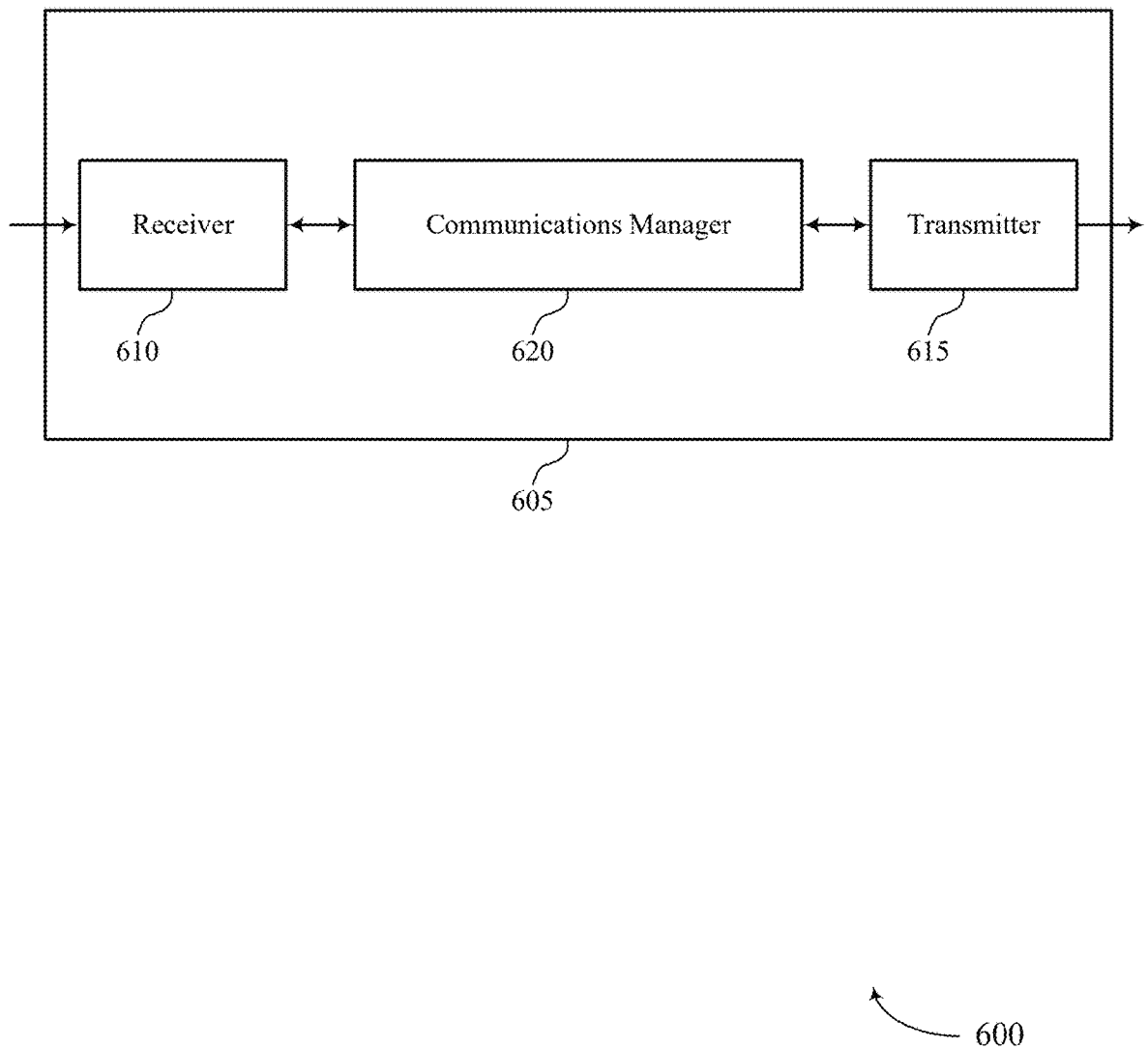
FIGS. 6 and 7 show block diagrams of devices that support high performance low power link for UWB in accordance with one or more aspects of the present disclosure.

FIG. 6 shows a block diagram 600 of a device 605 that supports high performance low power link for UWB in accordance with one or more aspects of the present disclosure. The device 605 may be an example of aspects of a receiving device as described herein (e.g., such as a UE 115 or a network entity 105). The device 605 may include a receiver 610, a transmitter 615, and a communications manager 620. The device 605, or one or more components of the device 605 (e.g., the receiver 610, the transmitter 615, the communications manager 620), may include at least one processor, which may be coupled with at least one memory, to, individually or collectively, support or enable the described techniques. Each of these components may be in communication with one another (e.g., via one or more buses).

The receiver 610 may provide a means for obtaining (e.g., receiving, determining, identifying) information such as packets, user data, control information, or any combination thereof (e.g., I/Q samples, symbols, packets, protocol data units, service data units) associated with various information channels (e.g., control channels, data channels, channels associated with a protocol stack, information channels related to high performance low power link for UWB). Information may be passed on to other components of the device 605. The receiver 610 may utilize a single antenna or a set of multiple antennas. Additionally, or alternatively, the receiver 610 may support obtaining information by receiving signals via one or more wired (e.g., electrical, fiber optic) interfaces, wireless interfaces, or any combination thereof.

The transmitter 615 may provide a means for outputting (e.g., transmitting signals, providing, conveying, sending) information generated by other components of the device 605. For example, the transmitter 615 may output (e.g., transmit) information such as packets, user data, control information, or any combination thereof (e.g., I/Q samples, symbols, packets, protocol data units, service data units) associated with various information channels (e.g., control channels, data channels, channels associated with a protocol stack, information channels related to high performance low power link for UWB). In some examples, the transmitter 615 may be co-located with a receiver 610 in a transceiver module. The transmitter 615 may utilize a single antenna or a set of multiple antennas. Additionally, or alternatively, the transmitter 615 may support outputting information by transmitting signals via one or more wired (e.g., electrical, fiber optic) interfaces, wireless interfaces, or any combination thereof. In some examples, the transmitter 615 and the receiver 610 may be co-located in a transceiver, which may include or be coupled with a modem.

The communications manager 620, the receiver 610, the transmitter 615, or various combinations or components thereof may be examples of means for performing various aspects of high performance low power link for UWB as described herein. For example, the communications manager 620, the receiver 610, the transmitter 615, or various combinations or components thereof may be capable of performing one or more of the functions described herein.

In some examples, the communications manager 620, the receiver 610, the transmitter 615, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 620, the receiver 610, the transmitter 615, or various combinations or components thereof may be implemented in code (e.g., as communications management software or firmware) executed by at least one processor (e.g., referred to as a processor-executable code). If implemented in code executed by at least one processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications in accordance with examples as disclosed herein. For example, the communications manager 620 is capable of, configured to, or operable to support a means for splitting a received signal into a first quantity of signal streams, where the first quantity of signal streams is based on an intra-symbol duty cycle of the received signal. The communications manager 620 is capable of, configured to, or operable to support a means for performing a Fourier transform operation on each signal stream of the first quantity of signal streams. The communications manager 620 is capable of, configured to, or operable to support a means for estimating a symbol of the received signal using information from each signal streams of the first quantity of signal streams on which the Fourier transform operation was performed.

By including or configuring the communications manager 620 in accordance with examples as described herein, the device 605 (e.g., at least one processor controlling or otherwise coupled with the receiver 610, the transmitter 615, the communications manager 620, or a combination thereof) may support techniques for reduced processing, and reduced power consumption, among other examples.

Figure 7:
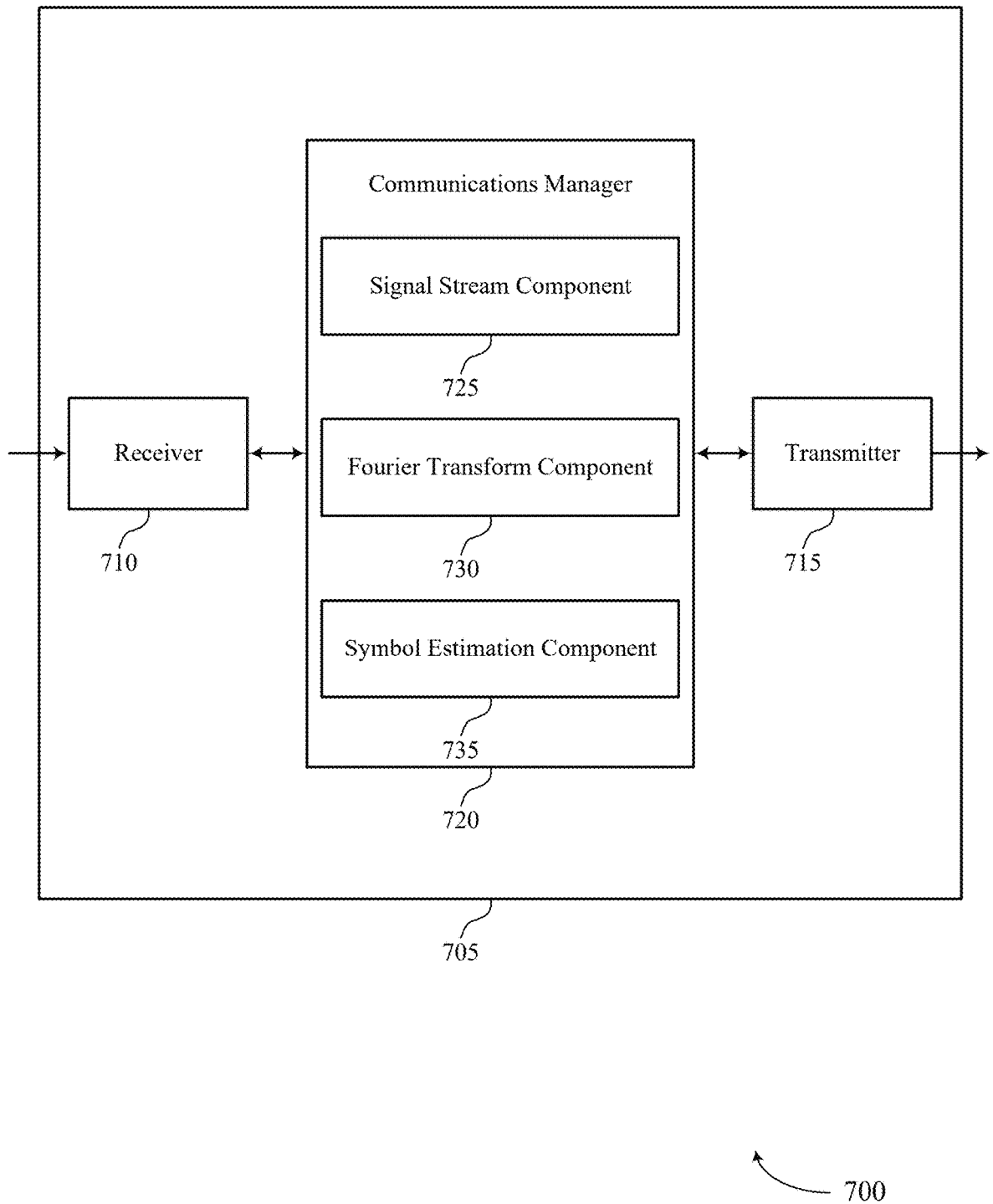

FIG. 7 shows a block diagram 700 of a device 705 that supports high performance low power link for UWB in accordance with one or more aspects of the present disclosure. The device 705 may be an example of aspects of a device 605 or a receiving device 215 as described herein. The device 705 may include a receiver 710, a transmitter 715, and a communications manager 720. The device 705, or one or more components of the device 705 (e.g., the receiver 710, the transmitter 715, the communications manager 720), may include at least one processor, which may be coupled with at least one memory, to support the described techniques. Each of these components may be in communication with one another (e.g., via one or more buses).

The receiver 710 may provide a means for obtaining (e.g., receiving, determining, identifying) information such as packets, user data, control information, or any combination thereof (e.g., I/Q samples, symbols, packets, protocol data units, service data units) associated with various information channels (e.g., control channels, data channels, channels associated with a protocol stack, information channels related to high performance low power link for UWB). Information may be passed on to other components of the device 705. The receiver 710 may utilize a single antenna or a set of multiple antennas. Additionally, or alternatively, the receiver 710 may support obtaining information by receiving signals via one or more wired (e.g., electrical, fiber optic) interfaces, wireless interfaces, or any combination thereof.

The transmitter 715 may provide a means for outputting (e.g., transmitting signals, providing, conveying, sending) information generated by other components of the device 705. For example, the transmitter 715 may output (e.g., transmit) information such as packets, user data, control information, or any combination thereof (e.g., I/Q samples, symbols, packets, protocol data units, service data units) associated with various information channels (e.g., control channels, data channels, channels associated with a protocol stack, information channels related to high performance low power link for UWB). In some examples, the transmitter 715 may be co-located with a receiver 710 in a transceiver module. The transmitter 715 may utilize a single antenna or a set of multiple antennas. Additionally, or alternatively, the transmitter 715 may support outputting information by transmitting signals via one or more wired (e.g., electrical, fiber optic) interfaces, wireless interfaces, or any combination thereof. In some examples, the transmitter 715 and the receiver 710 may be co-located in a transceiver, which may include or be coupled with a modem.

The device 705, or various components thereof, may be an example of means for performing various aspects of high performance low power link for UWB as described herein. For example, the communications manager 720 may include a signal stream component 725, a Fourier transform component 730, a symbol estimation component 735, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications in accordance with examples as disclosed herein. The signal stream component 725 is capable of, configured to, or operable to support a means for splitting a received signal into a first quantity of signal streams, where the first quantity of signal streams is based on an intra-symbol duty cycle of the received signal. The Fourier transform component 730 is capable of, configured to, or operable to support a means for performing a Fourier transform operation on each signal stream of the first quantity of signal streams. The symbol estimation component 735 is capable of, configured to, or operable to support a means for estimating a symbol of the received signal using information from each signal streams of the first quantity of signal streams on which the Fourier transform operation was performed.

Figure 8:
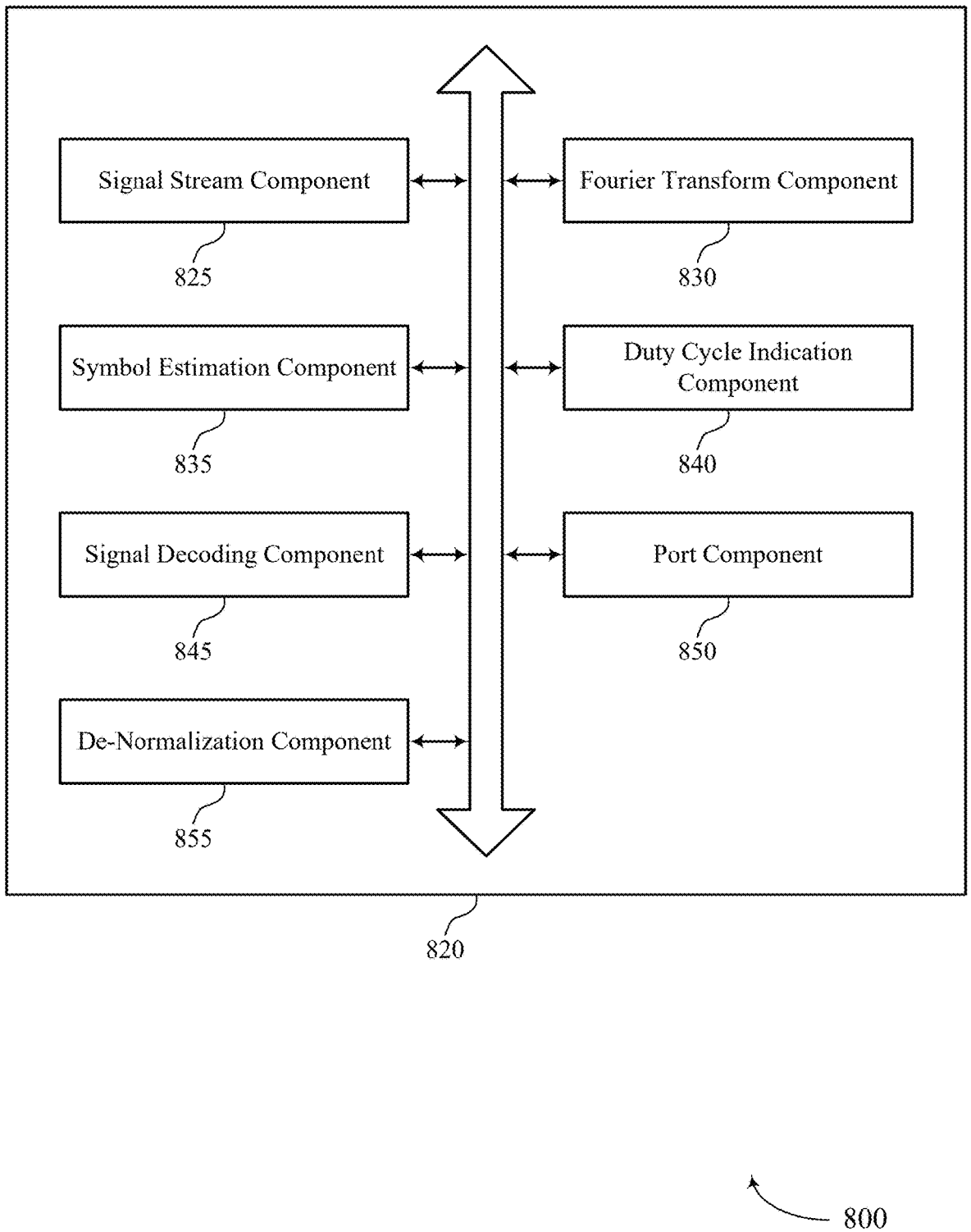
FIG. 8 shows a block diagram of a communications manager that supports high performance low power link for UWB in accordance with one or more aspects of the present disclosure.

FIG. 8 shows a block diagram 800 of a communications manager 820 that supports high performance low power link for UWB in accordance with one or more aspects of the present disclosure. The communications manager 820 may be an example of aspects of a communications manager 620, a communications manager 720, or both, as described herein. The communications manager 820, or various components thereof, may be an example of means for performing various aspects of high performance low power link for UWB as described herein. For example, the communications manager 820 may include a signal stream component 825, a Fourier transform component 830, a symbol estimation component 835, a duty cycle indication component 840, a signal decoding component 845, a port component 850, a de-normalization component 855, or any combination thereof. Each of these components, or components or subcomponents thereof (e.g., one or more processors, one or more memories), may communicate, directly or indirectly, with one another (e.g., via one or more buses).

The communications manager 820 may support wireless communications in accordance with examples as disclosed herein. The signal stream component 825 is capable of, configured to, or operable to support a means for splitting a received signal into a first quantity of signal streams, where the first quantity of signal streams is based on an intra-symbol duty cycle of the received signal. The Fourier transform component 830 is capable of, configured to, or operable to support a means for performing a Fourier transform operation on each signal stream of the first quantity of signal streams. The symbol estimation component 835 is capable of, configured to, or operable to support a means for estimating a symbol of the received signal using information from each signal streams of the first quantity of signal streams on which the Fourier transform operation was performed.

In some examples, the duty cycle indication component 840 is capable of, configured to, or operable to support a means for receiving an indication of the intra-symbol duty cycle of the received signal, the first quantity of signal streams being based on the intra-symbol duty cycle, where splitting the received signal into the first quantity of signal streams is based on receiving the indication. In some examples, the signal decoding component 845 is capable of, configured to, or operable to support a means for decoding the received signal based on estimating one or more symbols using the first quantity of signal streams.

In some examples, to support estimating the symbol, the symbol estimation component 835 is capable of, configured to, or operable to support a means for combining outputs of the Fourier transform operation of each signal stream of the first quantity of signal streams. In some examples, to support estimating the symbol, the symbol estimation component 835 is capable of, configured to, or operable to support a means for performing a calculation on the combined outputs using a MMSE estimation process.

In some examples, to support estimating the symbol, the symbol estimation component 835 is capable of, configured to, or operable to support a means for performing a set of calculations on outputs of the Fourier transform operation of each signal stream of the first quantity of signal streams, where a respective calculation uses a MMSE estimation process and corresponds to each output of each Fourier transform operation. In some examples, to support estimating the symbol, the symbol estimation component 835 is capable of, configured to, or operable to support a means for combining outputs of the set of calculations, where estimating the symbol is based on the combined outputs of the set of calculations.

In some examples, the port component 850 is capable of, configured to, or operable to support a means for receiving the received signal using a set of multiple ports, where each respective port of the set of multiple ports corresponds to a respective signal stream. In some examples, each signal stream of the first quantity of signal streams is associated with a respective Fourier transform window.

In some examples, the de-normalization component 855 is capable of, configured to, or operable to support a means for performing a de-normalization operation on each frequency resource of a set of multiple resources associated with the received signal based on the first quantity of signal streams.

Figure 9:
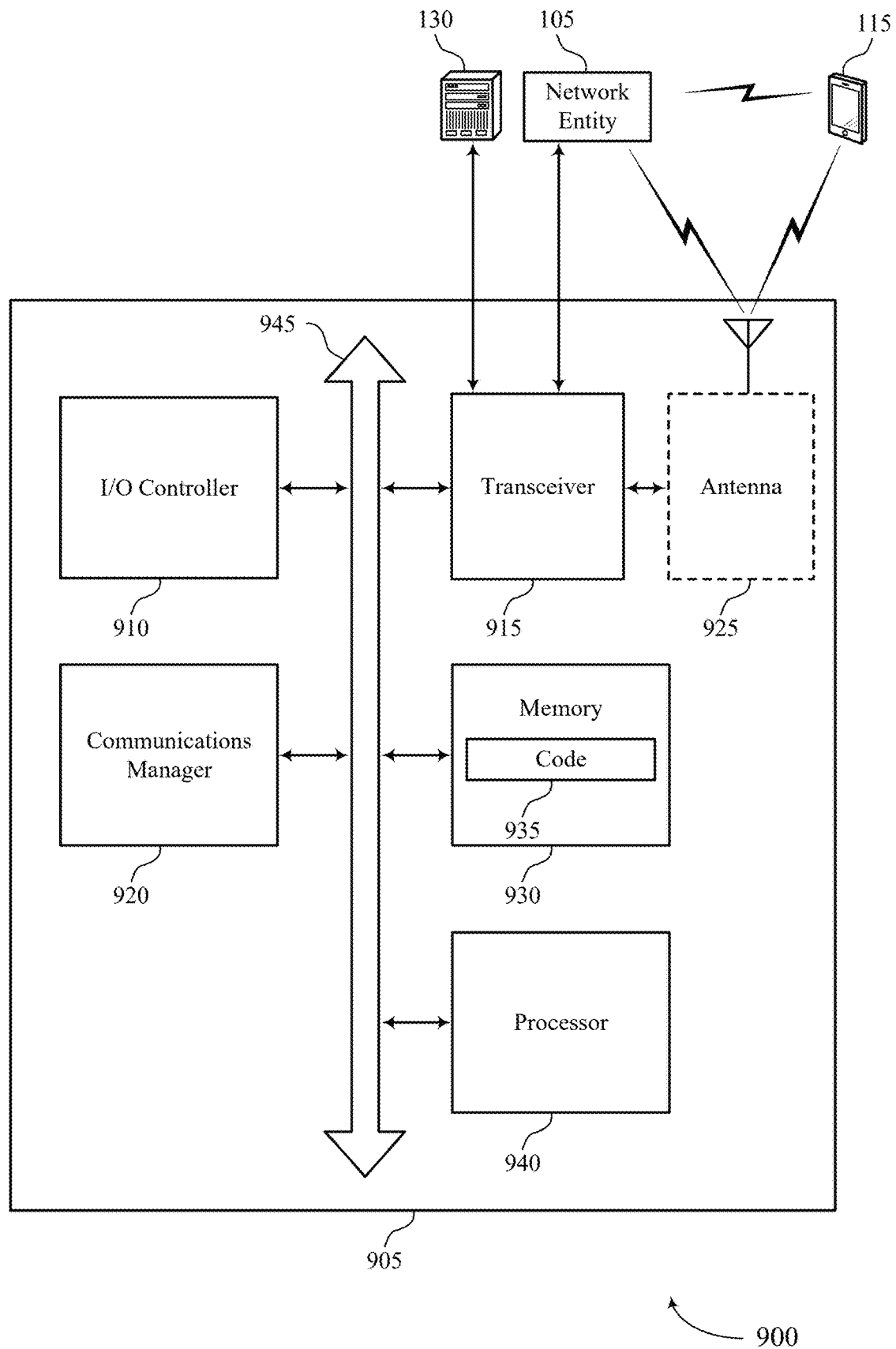
FIG. 9 shows a diagram of a system including a device that supports high performance low power link for UWB in accordance with one or more aspects of the present disclosure.

FIG. 9 shows a diagram of a system 900 including a device 905 that supports high performance low power link for UWB in accordance with one or more aspects of the present disclosure. The device 905 may be an example of or include components of a device 605, a device 705, or a receiving device as described herein. In some examples, the device 905 may be a UE 115 as described herein. In other examples, the device 905 may be a network entity 105 as described herein. The device 905 may include components for bi-directional voice and data communications including components for transmitting and receiving communications, such as a communications manager 920, an I/O controller 910, a transceiver 915, one or more antennas 925, at least one memory 930, code 935, and at least one processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of one or more processors, such as the at least one processor 940. In some cases, a user may interact with the device 905 via the I/O controller 910 or via hardware components controlled by the I/O controller 910.

The transceiver 915 may support bi-directional communications via wired links, wireless links, or both as described herein. In some examples, the transceiver 915 may include a wired transceiver and may communicate bi-directionally with another wired transceiver. Additionally, or alternatively, in some examples, the transceiver 915 may include a wireless transceiver and may communicate bi-directionally with another wireless transceiver. In some examples, the device 905 may include one or more antennas 925, which may be capable of transmitting or receiving wireless transmissions (e.g., concurrently). The transceiver 915 may also include a modem to modulate signals, to provide the modulated signals for transmission (e.g., by one or more antennas 925, by a wired transmitter), to receive modulated signals (e.g., from one or more antennas 925, from a wired receiver), and to demodulate signals. In some implementations, the transceiver 915 may include one or more interfaces, such as one or more interfaces coupled with the one or more antennas 925 that are configured to support various receiving or obtaining operations, one or more interfaces coupled with the one or more antennas 925 that are configured to support various transmitting or outputting operations, or a combination thereof. In some examples, the transceiver 915 may include the modem to modulate the packets, to provide the modulated packets to one or more antennas 925 for transmission, and to demodulate packets received from the one or more antennas 925.

In some implementations, the transceiver 915 may include or be configured for coupling with one or more processors or one or more memory components that are operable to perform or support operations based on received or obtained information or signals, or to generate information or other signals for transmission or other outputting, or any combination thereof. The transceiver 915, or the transceiver 915 and one or more antennas 925, may be an example of a transmitter 615, a transmitter 715, a receiver 610, a receiver 710, or any combination thereof or component thereof, as described herein.

In some implementations, the transceiver 915, or the transceiver 915 and the one or more antennas 925, or the transceiver 915 and the one or more antennas 925 and one or more processors or one or more memory components (e.g., the at least one processor 940, the at least one memory 930, or both), may be included in a chip or chip assembly that is installed in the device 905. In some examples, the transceiver 915 may be operable to support communications via one or more communications links (e.g., communication link(s) 125, backhaul communication link(s) 120, a midhaul communication link 162, a fronthaul communication link 168).

The at least one memory 930 may include RAM, ROM, or any combination thereof. The at least one memory 930 may store computer-readable, computer-executable, or processor-executable code, such as the code 935. The code 935 may include instructions that, when executed by one or more of the at least one processor 940, cause the device 905 to perform various functions described herein. The code 935 may be stored in a non-transitory computer-readable medium such as system memory or another type of memory. In some cases, the code 935 may not be directly executable by a processor of the at least one processor 940 but may cause a computer (e.g., when compiled and executed) to perform functions described herein. In some cases, the at least one memory 930 may include, among other things, a BIOS which may control basic hardware or software operation such as the interaction with peripheral components or devices. In some examples, the at least one processor 940 may include multiple processors and the at least one memory 930 may include multiple memories. One or more of the multiple processors may be coupled with one or more of the multiple memories which may, individually or collectively, be configured to perform various functions herein (for example, as part of a processing system).

The at least one processor 940 may include one or more intelligent hardware devices (e.g., one or more general-purpose processors, one or more DSPs, one or more CPUs, one or more graphics processing units (GPUs), one or more neural processing units (NPUs) (also referred to as neural network processors or deep learning processors (DLPs)), one or more microcontrollers, one or more ASICs, one or more FPGAs, one or more programmable logic devices, discrete gate or transistor logic, one or more discrete hardware components, or any combination thereof). In some cases, the at least one processor 940 may be configured to operate a memory array using a memory controller. In some other cases, a memory controller may be integrated into one or more of the at least one processor 940. The at least one processor 940 may be configured to execute computer-readable instructions stored in a memory (e.g., one or more of the at least one memory 930) to cause the device 905 to perform various functions (e.g., functions or tasks supporting high performance low power link for UWB). For example, the device 905 or a component of the device 905 may include at least one processor 940 and at least one memory 930 coupled with or to one or more of the at least one processor 940, the at least one processor 940 and the at least one memory 930 configured to perform various functions described herein. The at least one processor 940 may be an example of a cloud-computing platform (e.g., one or more physical nodes and supporting software such as operating systems, virtual machines, or container instances) that my host the functions (e.g., by executing code 935) to perform the functions of the device 905. The at least one processor 940 may be any one or more suitable processors capable of executing scripts or instructions of one or more software programs stored in the device 905 (such as within one or more of the at least one memory 930).

In some examples, the at least one processor 940 may include multiple processors and the at least one memory 930 may include multiple memories. One or more of the multiple processors may be coupled with one or more of the multiple memories, which may, individually or collectively, be configured to perform various functions described herein. In some examples, the at least one processor 940 may be a component of a processing system, which may refer to a system (such as a series) of machines, circuitry (including, for example, one or both of processor circuitry (which may include the at least one processor 940) and memory circuitry (which may include the at least one memory 930)), or components, that receives or obtains inputs and processes the inputs to produce, generate, or obtain a set of outputs. The processing system may be configured to perform one or more of the functions described herein. For example, the at least one processor 940 or a processing system including the at least one processor 940 may be configured to, configurable to, or operable to cause the device 905 to perform one or more of the functions described herein. Further, as described herein, being "configured to," being "configurable to," and being "operable to" may be used interchangeably and may be associated with a capability, when executing code 935 (e.g., processor-executable code) stored in the at least one memory 930 or otherwise, to perform one or more of the functions described herein.

In some examples, the bus 945 may support communications of (e.g., within) a protocol layer of a protocol stack. In some examples, the bus 945 may support communications associated with a logical channel of a protocol stack (e.g., between protocol layers of a protocol stack), which may include communications performed within a component of the device 905, or between different components of the device 905 that may be co-located or located in different locations (e.g., where the device 905 may refer to a system in which one or more of the communications manager 920, the transceiver 915, the at least one memory 930, the code 935, and the at least one processor 940 may be located in one of the different components or divided between different components).

In some examples, the communications manager 920 may manage aspects of communications with a core network 130 (e.g., via one or more wired or wireless backhaul links). For example, the communications manager 920 may manage the transfer of data communications for client devices, such as one or more UEs 115. In some examples, the communications manager 920 may manage communications with one or more other network entities 105, and may include a controller or scheduler for controlling communications with UEs 115 (e.g., in cooperation with the one or more other network devices). In some examples, the communications manager 920 may support an X2 interface within an LTE/LTE-A wireless communications network technology to provide communication between network entities 105.

The communications manager 920 may support wireless communications in accordance with examples as disclosed herein. For example, the communications manager 920 is capable of, configured to, or operable to support a means for splitting a received signal into a first quantity of signal streams, where the first quantity of signal streams is based on an intra-symbol duty cycle of the received signal. The communications manager 920 is capable of, configured to, or operable to support a means for performing a Fourier transform operation on each signal stream of the first quantity of signal streams. The communications manager 920 is capable of, configured to, or operable to support a means for estimating a symbol of the received signal using information from each signal streams of the first quantity of signal streams on which the Fourier transform operation was performed.

By including or configuring the communications manager 920 in accordance with examples as described herein, the device 905 may support techniques for, reduced latency (e.g., based on multiple receive chains), reduced power consumption, and longer battery life, among other examples.

In some examples, the communications manager 920 may be configured to perform various operations (e.g., receiving, obtaining, monitoring, outputting, transmitting) using or otherwise in cooperation with the transceiver 915, the one or more antennas 925 (e.g., where applicable), or any combination thereof. Although the communications manager 920 is illustrated as a separate component, in some examples, one or more functions described with reference to the communications manager 920 may be supported by or performed by the transceiver 915, one or more of the at least one processor 940, one or more of the at least one memory 930, the code 935, or any combination thereof (for example, by a processing system including at least a portion of the at least one processor 940, the at least one memory 930, the code 935, or any combination thereof). For example, the code 935 may include instructions executable by one or more of the at least one processor 940 to cause the device 905 to perform various aspects of high performance low power link for UWB as described herein, or the at least one processor 940 and the at least one memory 930 may be otherwise configured to, individually or collectively, perform or support such operations.

Figure 10:
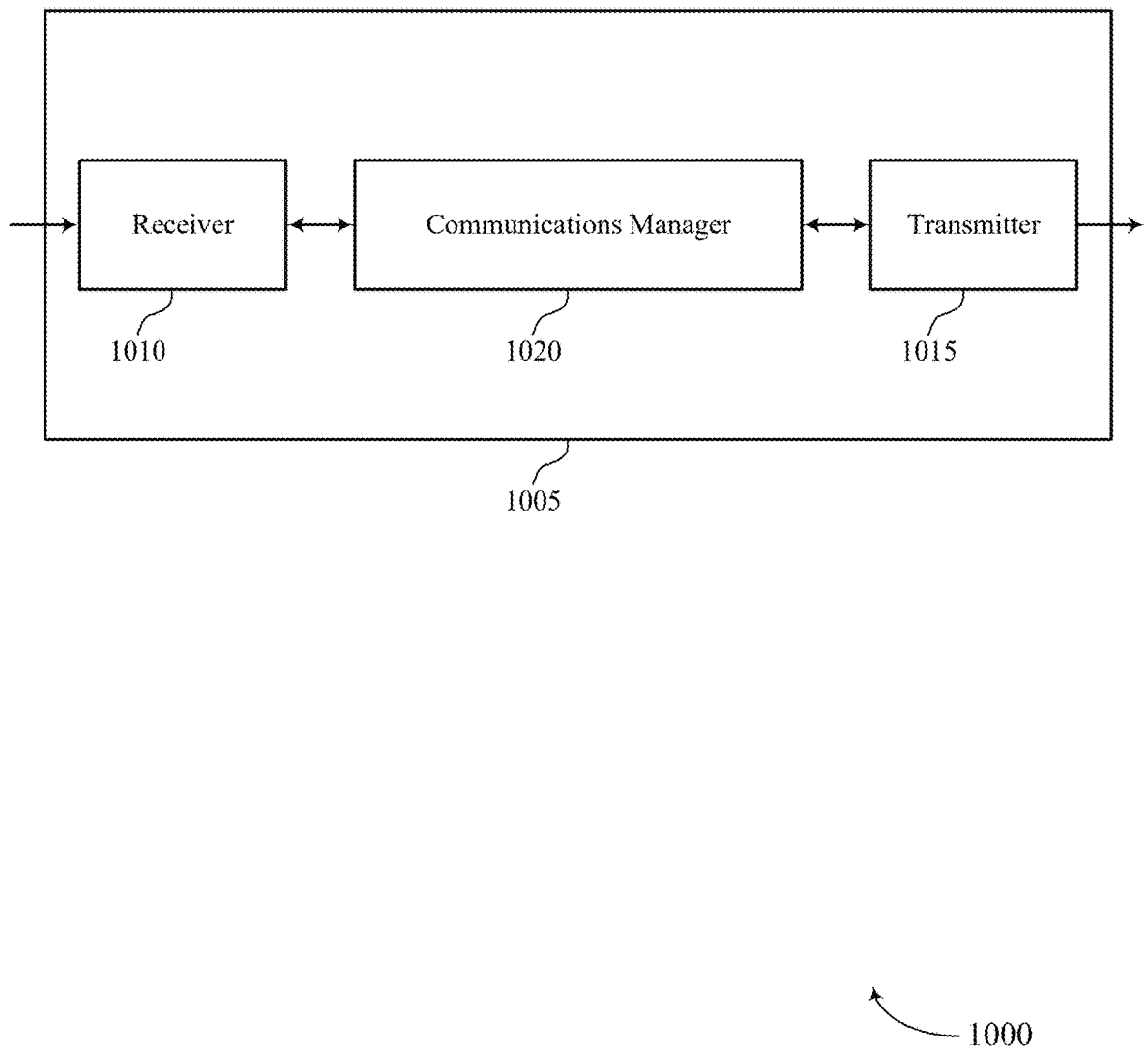
FIGS. 10 and 11 show block diagrams of devices that support high performance low power link for UWB in accordance with one or more aspects of the present disclosure.

FIG. 10 shows a block diagram 1000 of a device 1005 that supports high performance low power link for UWB in accordance with one or more aspects of the present disclosure. The device 1005 may be an example of aspects of a transmitting device (e.g., such as a UE 115 or a network entity 105) as described herein. The device 1005 may include a receiver 1010, a transmitter 1015, and a communications manager 1020. The device 1005, or one or more components of the device 1005 (e.g., the receiver 1010, the transmitter 1015, the communications manager 1020), may include at least one processor, which may be coupled with at least one memory, to, individually or collectively, support or enable the described techniques. Each of these components may be in communication with one another (e.g., via one or more buses).

The receiver 1010 may provide a means for obtaining (e.g., receiving, determining, identifying) information such as packets, user data, control information, or any combination thereof (e.g., I/Q samples, symbols, packets, protocol data units, service data units) associated with various channels (e.g., control channels, data channels, information channels, channels associated with a protocol stack, information channels related to high performance low power link for UWB). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting signals, providing, conveying, sending) information generated by other components of the device 1005. For example, the transmitter 1015 may output (e.g., transmit) information such as packets, user data, control information, or any combination thereof (e.g., I/Q samples, symbols, packets, protocol data units, service data units) associated with various channels (e.g., control channels, data channels, information channels, channels associated with a protocol stack, information channels related to high performance low power link for UWB). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The communications manager 1020, the receiver 1010, the transmitter 1015, or various combinations or components thereof may be examples of means for performing various aspects of high performance low power link for UWB as described herein. For example, the communications manager 1020, the receiver 1010, the transmitter 1015, or various combinations or components thereof may be capable of performing one or more of the functions described herein.

In some examples, the communications manager 1020, the receiver 1010, the transmitter 1015, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 1020, the receiver 1010, the transmitter 1015, or various combinations or components thereof may be implemented in code (e.g., as communications management software or firmware) executed by at least one processor (e.g., referred to as a processor-executable code). If implemented in code executed by at least one processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications in accordance with examples as disclosed herein. For example, the communications manager 1020 is capable of, configured to, or operable to support a means for inserting one or more null values into a signal after each sample of the signal, where a quantity of the one or more null values is according to an intra-symbol duty cycle associated with the signal. The communications manager 1020 is capable of, configured to, or operable to support a means for performing a pre-equalization operation on the signal after inserting the one or more null values. The communications manager 1020 is capable of, configured to, or operable to support a means for transmitting the pre-equalized signal.

By including or configuring the communications manager 1020 in accordance with examples as described herein, the device 1005 (e.g., at least one processor controlling or otherwise coupled with the receiver 1010, the transmitter 1015, the communications manager 1020, or a combination thereof) may support techniques for reduced processing, and reduced power consumption, among other examples.

Figure 11:
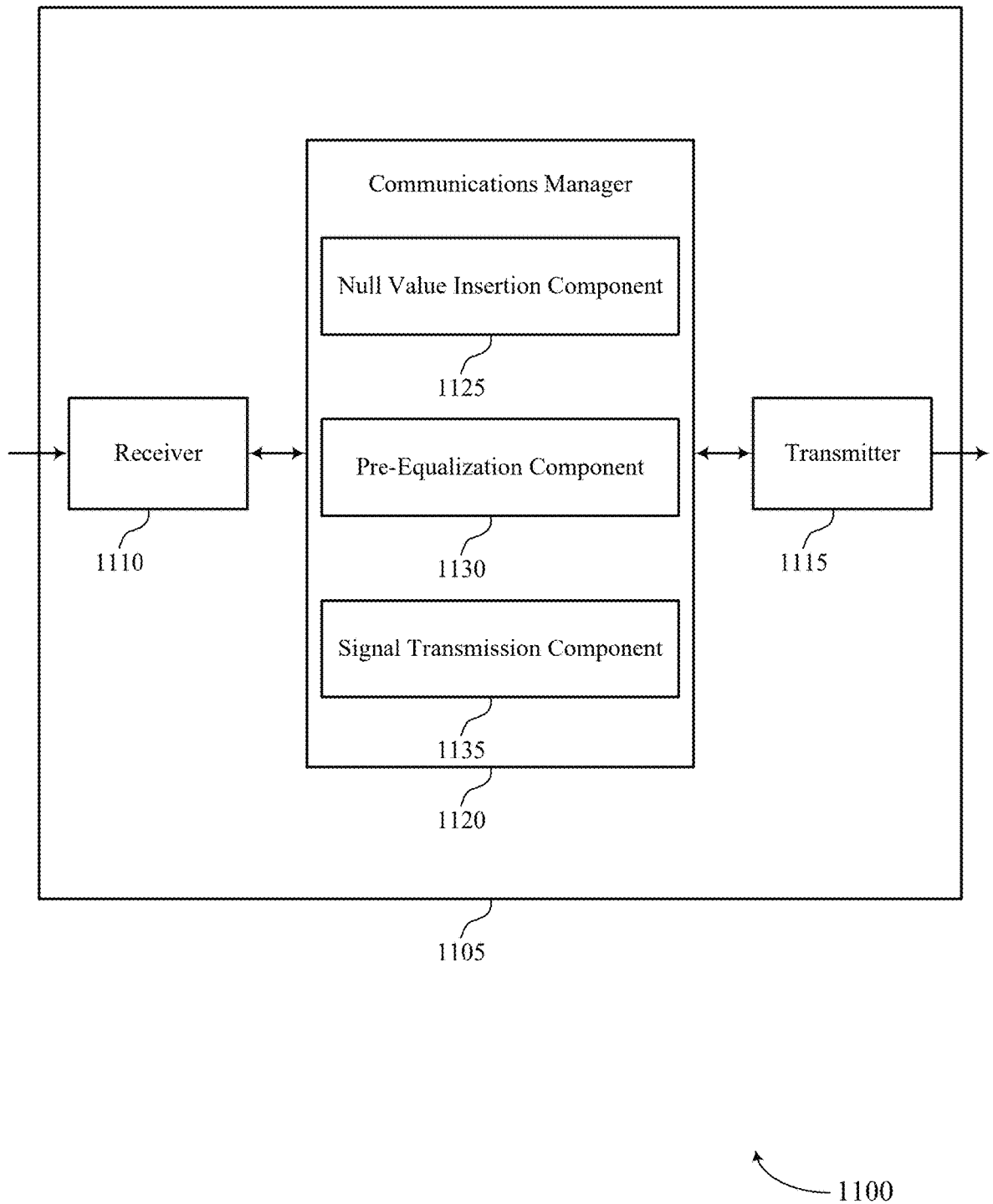

FIG. 11 shows a block diagram 1100 of a device 1105 that supports high performance low power link for UWB in accordance with one or more aspects of the present disclosure. The device 1105 may be an example of aspects of a device 1005 or a transmitting device 205 as described herein. The device 1105 may include a receiver 1110, a transmitter 1115, and a communications manager 1120. The device 1105, or one or more components of the device 1105 (e.g., the receiver 1110, the transmitter 1115, the communications manager 1120), may include at least one processor, which may be coupled with at least one memory, to support the described techniques. Each of these components may be in communication with one another (e.g., via one or more buses).

The receiver 1110 may provide a means for obtaining (e.g., receiving, determining, identifying) information such as packets, user data, control information, or any combination thereof (e.g., I/Q samples, symbols, packets, protocol data units, service data units) associated with various channels (e.g., control channels, data channels, information channels, channels associated with a protocol stack, information channels related to high performance low power link for UWB). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting signals, providing, conveying, sending) information generated by other components of the device 1105. For example, the transmitter 1115 may output (e.g., transmit) information such as packets, user data, control information, or any combination thereof (e.g., I/Q samples, symbols, packets, protocol data units, service data units) associated with various channels (e.g., control channels, data channels, information channels, channels associated with a protocol stack, information channels related to high performance low power link for UWB). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The device 1105, or various components thereof, may be an example of means for performing various aspects of high performance low power link for UWB as described herein. For example, the communications manager 1120 may include a null value insertion component 1125, a pre-equalization component 1130, a signal transmission component 1135, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications in accordance with examples as disclosed herein. The null value insertion component 1125 is capable of, configured to, or operable to support a means for inserting one or more null values into a signal after each sample of the signal, where a quantity of the one or more null values is according to an intra-symbol duty cycle associated with the signal. The pre-equalization component 1130 is capable of, configured to, or operable to support a means for performing a pre-equalization operation on the signal after inserting the one or more null values. The signal transmission component 1135 is capable of, configured to, or operable to support a means for transmitting the pre-equalized signal.

Figure 12:
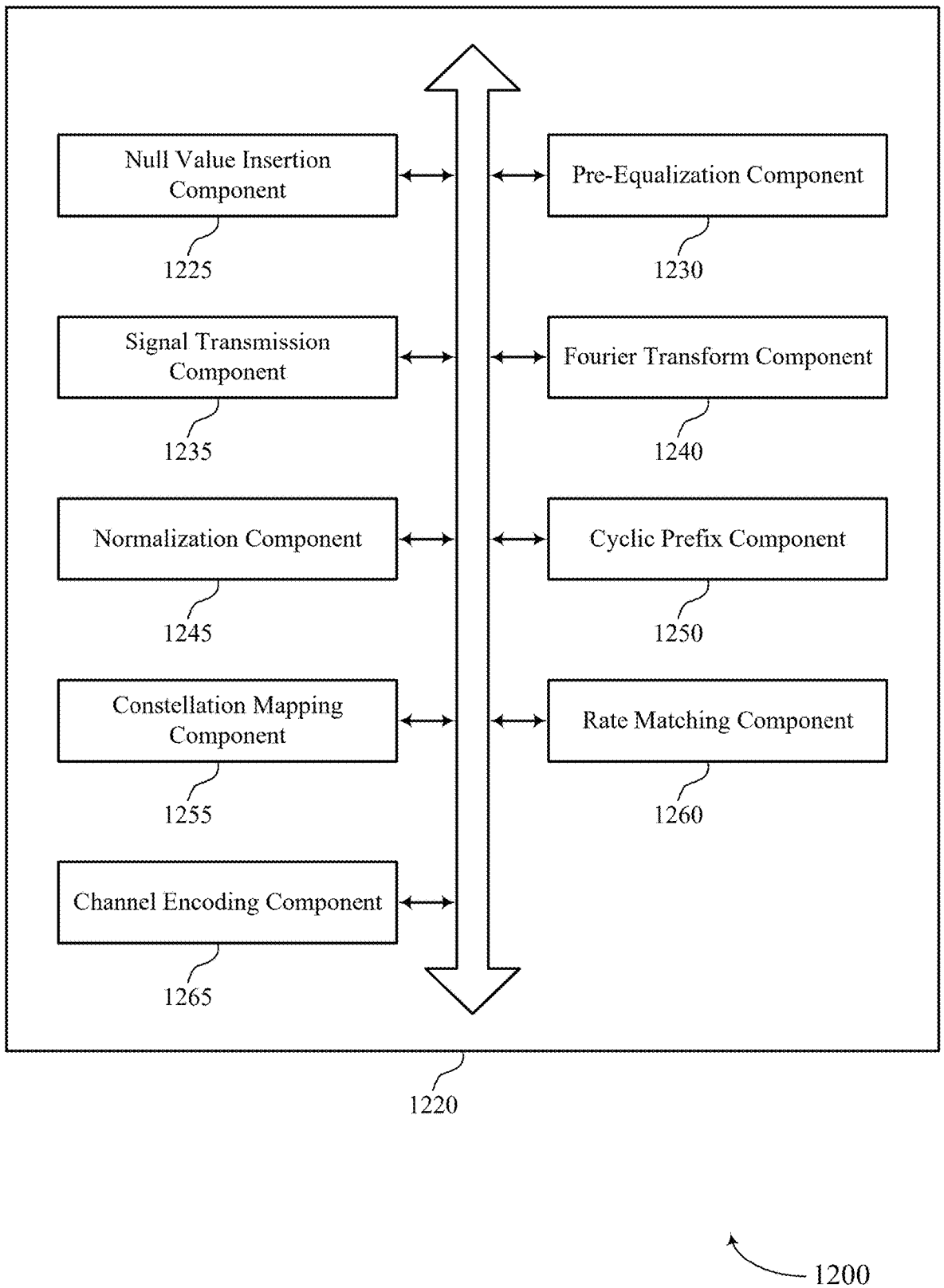
FIG. 12 shows a block diagram of a communications manager that supports high performance low power link for UWB in accordance with one or more aspects of the present disclosure.

FIG. 12 shows a block diagram 1200 of a communications manager 1220 that supports high performance low power link for UWB in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of high performance low power link for UWB as described herein. For example, the communications manager 1220 may include a null value insertion component 1225, a pre-equalization component 1230, a signal transmission component 1235, a Fourier transform component 1240, a normalization component 1245, a cyclic prefix component 1250, a constellation mapping component 1255, a rate matching component 1260, a channel encoding component 1265, or any combination thereof. Each of these components, or components or sub-components thereof (e.g., one or more processors, one or more memories), may communicate, directly or indirectly, with one another (e.g., via one or more buses).

The communications manager 1220 may support wireless communications in accordance with examples as disclosed herein. The null value insertion component 1225 is capable of, configured to, or operable to support a means for inserting one or more null values into a signal after each sample of the signal, where a quantity of the one or more null values is according to an intra-symbol duty cycle associated with the signal. The pre-equalization component 1230 is capable of, configured to, or operable to support a means for performing a pre-equalization operation on the signal after inserting the one or more null values. The signal transmission component 1235 is capable of, configured to, or operable to support a means for transmitting the pre-equalized signal.

In some examples, the Fourier transform component 1240 is capable of, configured to, or operable to support a means for performing a Fourier transform operation on the signal after inserting the one or more null values, where performing the pre-equalization operation is based on performing the Fourier transform operation.

In some examples, the normalization component 1245 is capable of, configured to, or operable to support a means for performing a normalization operation to each frequency resource of a set of multiple resources associated with the signal based on performing the pre-equalization operation, where the normalization operation is based on a power threshold associated with the transmitted signal.

In some examples, the Fourier transform component 1240 is capable of, configured to, or operable to support a means for performing an inverse Fourier transform operation on the pre-equalized signal after performing the pre-equalization operation. In some examples, the cyclic prefix component 1250 is capable of, configured to, or operable to support a means for applying a cyclic prefix to the pre-equalized signal, where transmitting the pre-equalized signal is based on performing the inverse Fourier transform operation and applying the cyclic prefix.

In some examples, to support inserting the one or more null values, the null value insertion component 1225 is capable of, configured to, or operable to support a means for inserting the one or more null values in a frequency domain using frequency-domain repetition, where the one or more null values are associated with a time domain. In some examples, the pre-equalized signal is transmitted across a set of multiple frequency bands. In some examples, a bandwidth of the set of multiple frequency bands spans at least 500 MHz.

In some examples, the Fourier transform component 1240 is capable of, configured to, or operable to support a means for performing an inverse Fourier transform operation on the signal, where inserting the one or more null values is based on performing the inverse Fourier transform operation.

In some examples, the constellation mapping component 1255 is capable of, configured to, or operable to support a means for performing a constellation mapping operation on the signal, where inserting the one or more null values is based on performing the constellation mapping operation.

In some examples, the rate matching component 1260 is capable of, configured to, or operable to support a means for performing a rate matching operation on the signal, where inserting the one or more null values is based on performing the rate matching operation.

In some examples, the channel encoding component 1265 is capable of, configured to, or operable to support a means for performing a channel encoding operation on the signal, where inserting the one or more null values is based on performing the channel encoding operation.

Figure 13:
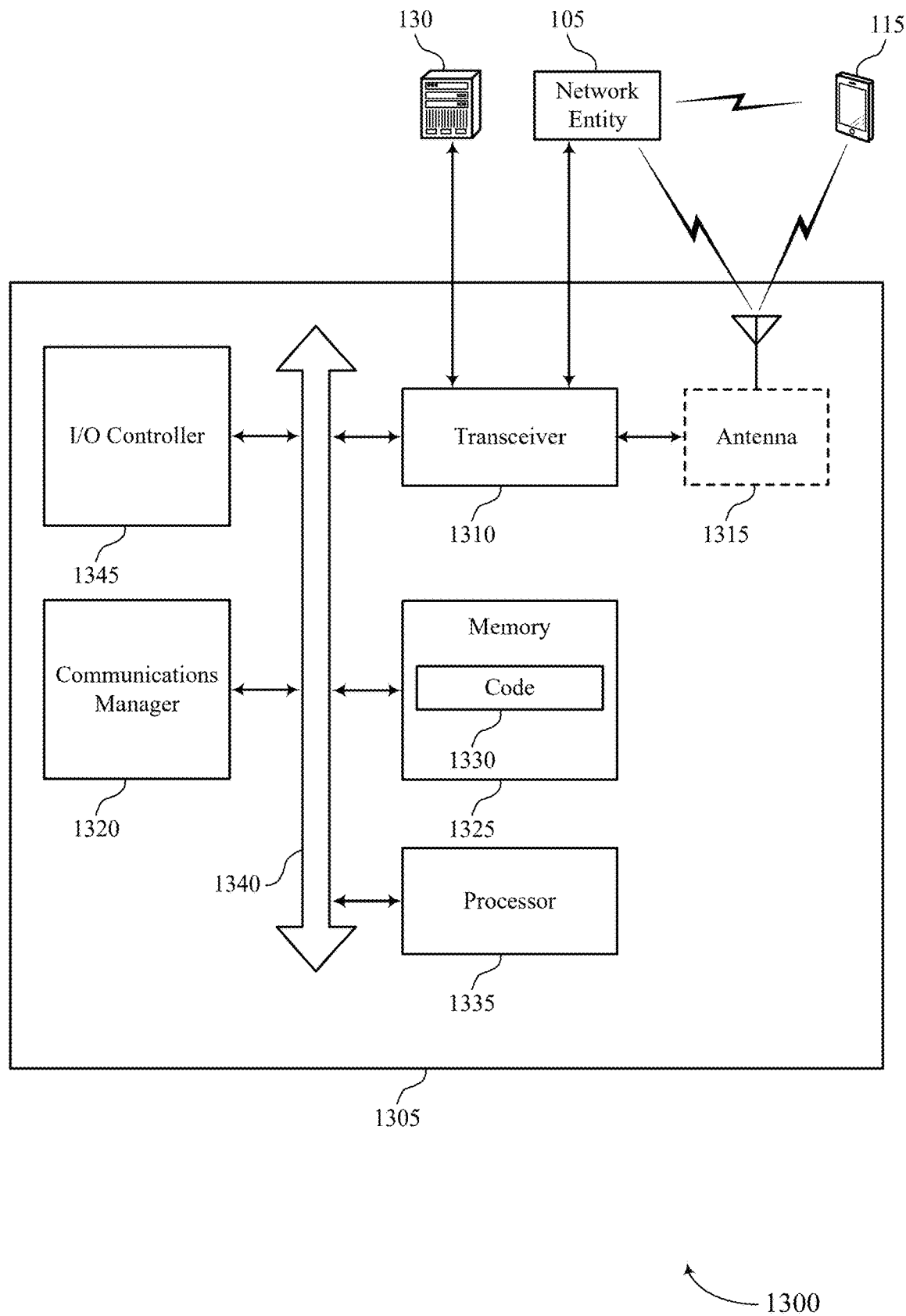
FIG. 13 shows a diagram of a system including a device that supports high performance low power link for UWB in accordance with one or more aspects of the present disclosure.

FIG. 13 shows a diagram of a system 1300 including a device 1305 that supports high performance low power link for UWB in accordance with one or more aspects of the present disclosure. The device 1305 may be an example of or include components of a device 1005, a device 1105, or a transmitting device as described herein. In some examples, the device 1305 may be a UE 115 as described herein. In other examples, the device 1305 may be a network entity 105 as described herein. The device 1305 may include components for bi-directional voice and data communications including components for transmitting and receiving communications, such as a communications manager 1320, a transceiver 1310, one or more antennas 1315, at least one memory 1325, code 1330, and at least one processor 1335. These components may be in electronic communication or otherwise coupled (e.g., operatively, communicatively, functionally, electronically, electrically) via one or more buses (e.g., a bus 1340). In some examples, the device 1305 may include an I/O controller 1345.

The I/O controller 1345 may manage input and output signals for the device 1305. The I/O controller 1345 may also manage peripherals not integrated into the device 1305. In some cases, the I/O controller 1345 may represent a physical connection or port to an external peripheral. In some cases, the I/O controller 1345 may utilize an operating system such as iOS®, ANDROID®, MS-DOS®, MS-WINDOWS®, OS/2®, UNIX®, LINUX®, or another known operating system. Additionally, or alternatively, the I/O controller 1345 may represent or interact with a modem, a keyboard, a mouse, a touchscreen, or a similar device. In some cases, the I/O controller 1345 may be implemented as part of one or more processors, such as the at least one processor 1335. In some cases, a user may interact with the device 1305 via the I/O controller 1345 or via hardware components controlled by the I/O controller 1345.

The transceiver 1310 may support bi-directional communications via wired links, wireless links, or both as described herein. In some examples, the transceiver 1310 may include a wired transceiver and may communicate bi-directionally with another wired transceiver. Additionally, or alternatively, in some examples, the transceiver 1310 may include a wireless transceiver and may communicate bi-directionally with another wireless transceiver. In some examples, the device 1305 may include one or more antennas 1315, which may be capable of transmitting or receiving wireless transmissions (e.g., concurrently). The transceiver 1310 may also include a modem to modulate signals, to provide the modulated signals for transmission (e.g., by one or more antennas 1315, by a wired transmitter), to receive modulated signals (e.g., from one or more antennas 1315, from a wired receiver), and to demodulate signals. In some implementations, the transceiver 1310 may include one or more interfaces, such as one or more interfaces coupled with the one or more antennas 1315 that are configured to support various receiving or obtaining operations, or one or more interfaces coupled with the one or more antennas 1315 that are configured to support various transmitting or outputting operations, or a combination thereof. In some examples, the transceiver 1310 may include the modem to modulate the packets, to provide the modulated packets to the one or more antennas 1315 for transmission, and to demodulate packets received from the one or more antennas 1315.

In some implementations, the transceiver 1310 may include or be configured for coupling with one or more processors or one or more memory components that are operable to perform or support operations based on received or obtained information or signals, or to generate information or other signals for transmission or other outputting, or any combination thereof. The transceiver 1310, or the transceiver 1310 and the one or more antennas 1315, may be an example of a transmitter 1015, a transmitter 1115, a receiver 1010, a receiver 1110, or any combination thereof or component thereof, as described herein.

In some implementations, the transceiver 1310, or the transceiver 1310 and the one or more antennas 1315, or the transceiver 1310 and the one or more antennas 1315 and one or more processors or one or more memory components (e.g., the at least one processor 1335, the at least one memory 1325, or both), may be included in a chip or chip assembly that is installed in the device 1305. In some examples, the transceiver 1310 may be operable to support communications via one or more communications links (e.g., communication link(s) 125, backhaul communication link(s) 120, a midhaul communication link 162, a fronthaul communication link 168).

The at least one memory 1325 may include RAM, ROM, or any combination thereof. The at least one memory 1325 may store computer-readable, computer-executable, or processor-executable code, such as the code 1330. The code 1330 may include instructions that, when executed by one or more of the at least one processor 1335, cause the device 1305 to perform various functions described herein. The code 1330 may be stored in a non-transitory computer-readable medium such as system memory or another type of memory. In some cases, the code 1330 may not be directly executable by a processor of the at least one processor 1335 but may cause a computer (e.g., when compiled and executed) to perform functions described herein. In some cases, the at least one memory 1325 may include, among other things, a BIOS which may control basic hardware or software operation such as the interaction with peripheral components or devices. In some examples, the at least one processor 1335 may include multiple processors and the at least one memory 1325 may include multiple memories. One or more of the multiple processors may be coupled with one or more of the multiple memories which may, individually or collectively, be configured to perform various functions herein (for example, as part of a processing system).

The at least one processor 1335 may include one or more intelligent hardware devices (e.g., one or more general-purpose processors, one or more DSPs, one or more CPUs, one or more graphics processing units (GPUs), one or more neural processing units (NPUs) (also referred to as neural network processors or deep learning processors (DLPs)), one or more microcontrollers, one or more ASICs, one or more FPGAs, one or more programmable logic devices, discrete gate or transistor logic, one or more discrete hardware components, or any combination thereof). In some cases, the at least one processor 1335 may be configured to operate a memory array using a memory controller. In some other cases, a memory controller may be integrated into one or more of the at least one processor 1335. The at least one processor 1335 may be configured to execute computer-readable instructions stored in a memory (e.g., one or more of the at least one memory 1325) to cause the device 1305 to perform various functions (e.g., functions or tasks supporting high performance low power link for UWB). For example, the device 1305 or a component of the device 1305 may include at least one processor 1335 and at least one memory 1325 coupled with one or more of the at least one processor 1335, the at least one processor 1335 and the at least one memory 1325 configured to perform various functions described herein. The at least one processor 1335 may be an example of a cloud-computing platform (e.g., one or more physical nodes and supporting software such as operating systems, virtual machines, or container instances) that may host the functions (e.g., by executing code 1330) to perform the functions of the device 1305. The at least one processor 1335 may be any one or more suitable processors capable of executing scripts or instructions of one or more software programs stored in the device 1305 (such as within one or more of the at least one memory 1325).

In some examples, the at least one processor 1335 may include multiple processors and the at least one memory 1325 may include multiple memories. One or more of the multiple processors may be coupled with one or more of the multiple memories, which may, individually or collectively, be configured to perform various functions herein. In some examples, the at least one processor 1335 may be a component of a processing system, which may refer to a system (such as a series) of machines, circuitry (including, for example, one or both of processor circuitry (which may include the at least one processor 1335) and memory circuitry (which may include the at least one memory 1325)), or components, that receives or obtains inputs and processes the inputs to produce, generate, or obtain a set of outputs. The processing system may be configured to perform one or more of the functions described herein. For example, the at least one processor 1335 or a processing system including the at least one processor 1335 may be configured to, configurable to, or operable to cause the device 1305 to perform one or more of the functions described herein. Further, as described herein, being "configured to," being "configurable to," and being "operable to" may be used interchangeably and may be associated with a capability, when executing code (e.g., processor-executable code) stored in the at least one memory 1325 or otherwise, to perform one or more of the functions described herein.

In some examples, a bus 1340 may support communications of (e.g., within) a protocol layer of a protocol stack. In some examples, a bus 1340 may support communications associated with a logical channel of a protocol stack (e.g., between protocol layers of a protocol stack), which may include communications performed within a component of the device 1305, or between different components of the device 1305 that may be co-located or located in different locations (e.g., where the device 1305 may refer to a system in which one or more of the communications manager 1320, the transceiver 1310, the at least one memory 1325, the code 1330, and the at least one processor 1335 may be located in one of the different components or divided between different components).

In some examples, the communications manager 1320 may manage aspects of communications with a core network 130 (e.g., via one or more wired or wireless backhaul links). For example, the communications manager 1320 may manage the transfer of data communications for client devices, such as one or more UEs 115. In some examples, the communications manager 1320 may manage communications with one or more other network entities 105, and may include a controller or scheduler for controlling communications with UEs 115 (e.g., in cooperation with the one or more other network devices). In some examples, the communications manager 1320 may support an X2 interface within an LTE/LTE-A wireless communications network technology to provide communication between network entities 105.

The communications manager 1320 may support wireless communications in accordance with examples as disclosed herein. For example, the communications manager 1320 is capable of, configured to, or operable to support a means for inserting one or more null values into a signal after each sample of the signal, where a quantity of the one or more null values is according to an intra-symbol duty cycle associated with the signal. The communications manager 1320 is capable of, configured to, or operable to support a means for performing a pre-equalization operation on the signal after inserting the one or more null values. The communications manager 1320 is capable of, configured to, or operable to support a means for transmitting the pre-equalized signal.

By including or configuring the communications manager 1320 in accordance with examples as described herein, the device 1305 may support techniques for reduced latency (e.g., based on multiple transmit chains), reduced power consumption, and longer battery life, among other examples.

In some examples, the communications manager 1320 may be configured to perform various operations (e.g., receiving, obtaining, monitoring, outputting, transmitting)

using or otherwise in cooperation with the transceiver 1310, the one or more antennas 1315 (e.g., where applicable), or any combination thereof. Although the communications manager 1320 is illustrated as a separate component, in some examples, one or more functions described with reference to the communications manager 1320 may be supported by or performed by the transceiver 1310, one or more of the at least one processor 1335, one or more of the at least one memory 1325, the code 1330, or any combination thereof (for example, by a processing system including at least a portion of the at least one processor 1335, the at least one memory 1325, the code 1330, or any combination thereof). For example, the code 1330 may include instructions executable by one or more of the at least one processor 1335 to cause the device 1305 to perform various aspects of high performance low power link for UWB as described herein, or the at least one processor 1335 and the at least one memory 1325 may be otherwise configured to, individually or collectively, perform or support such operations.

Figure 14:
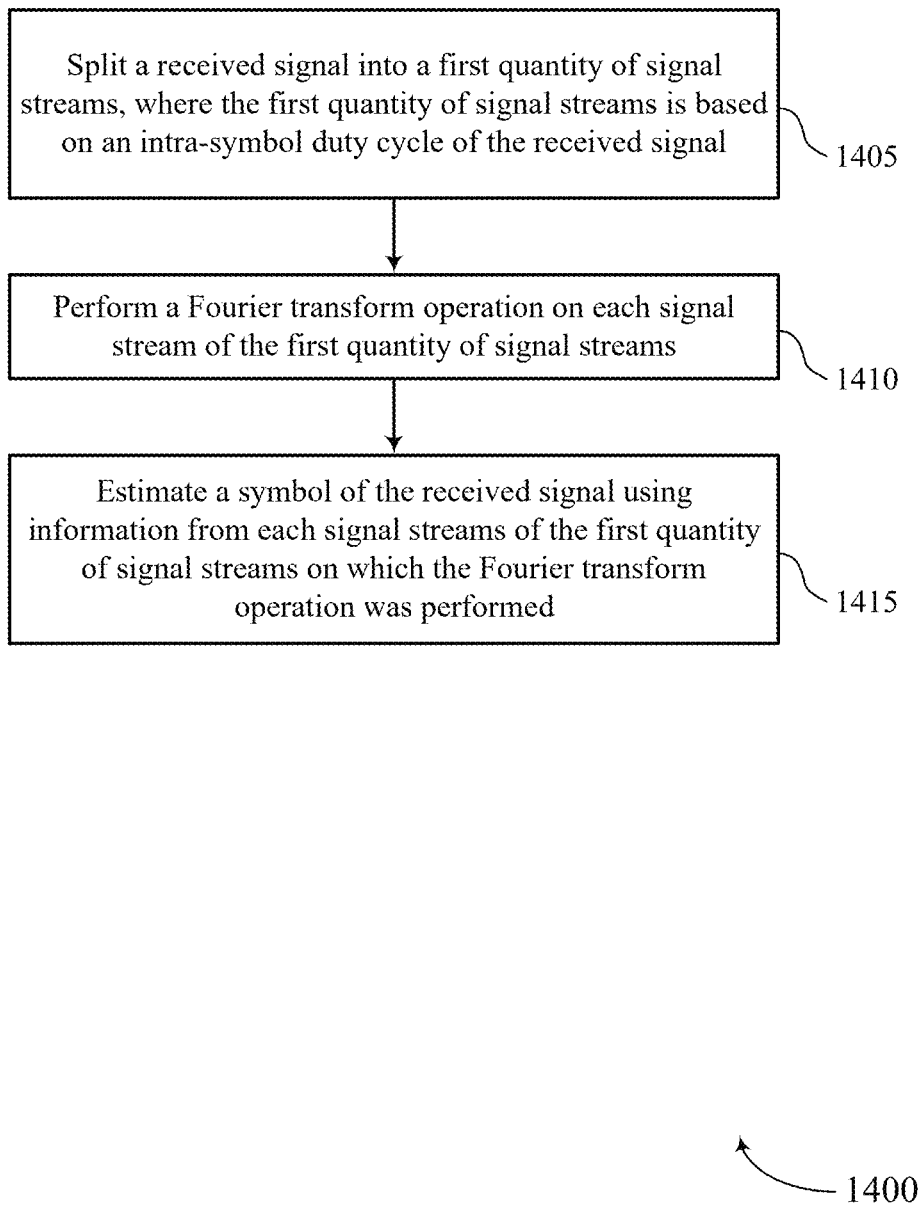
FIGS. 14 through 16 show flowcharts illustrating methods that support high performance low power link for UWB in accordance with one or more aspects of the present disclosure.

FIG. 14 shows a flowchart illustrating a method 1400 that supports high performance low power link for UWB in accordance with one or more aspects of the present disclosure. The operations of the method 1400 may be implemented by a receiving device or its components as described herein. For example, the operations of the method 1400 may be performed by a receiving device as described with reference to FIGS. 1 through 9. In some examples, a receiving device may execute a set of instructions to control the functional elements of the receiving device to perform the described functions. Additionally, or alternatively, the receiving device may perform aspects of the described functions using special-purpose hardware.

At 1405, the method may include splitting a received signal into a first quantity of signal streams, where the first quantity of signal streams is based on an intra-symbol duty cycle of the received signal. The operations of 1405 may be performed in accordance with examples as disclosed herein. In some examples, aspects of the operations of 1405 may be performed by a signal stream component 825 as described with reference to FIG. 8.

At 1410, the method may include performing a Fourier transform operation on each signal stream of the first quantity of signal streams. The operations of 1410 may be performed in accordance with examples as disclosed herein. In some examples, aspects of the operations of 1410 may be performed by a Fourier transform component 830 as described with reference to FIG. 8.

At 1415, the method may include estimating a symbol of the received signal using information from each signal streams of the first quantity of signal streams on which the Fourier transform operation was performed. The operations of 1415 may be performed in accordance with examples as disclosed herein. In some examples, aspects of the operations of 1415 may be performed by a symbol estimation component 835 as described with reference to FIG. 8.

Figure 15:
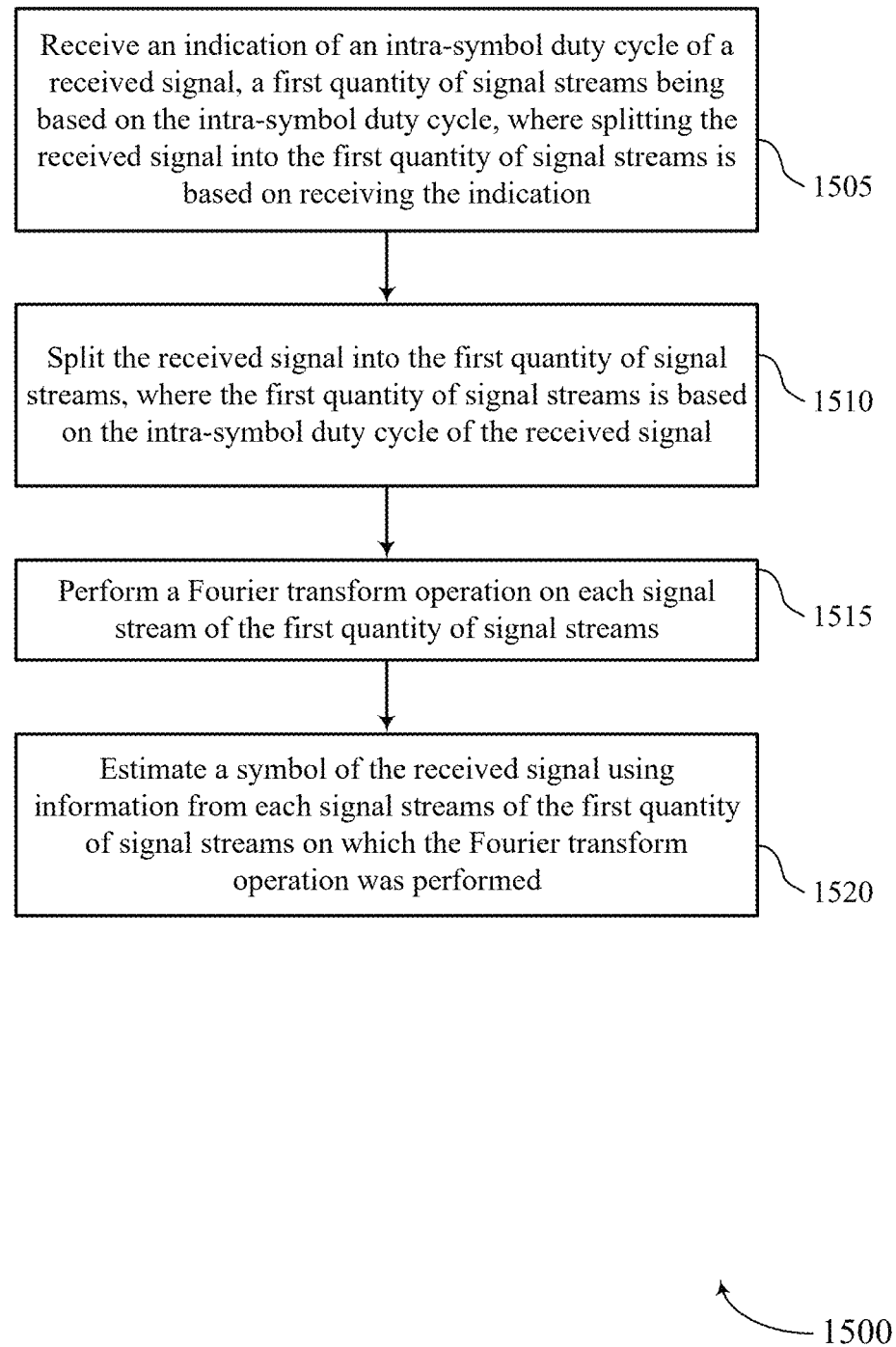

FIG. 15 shows a flowchart illustrating a method 1500 that supports high performance low power link for UWB in accordance with one or more aspects of the present disclosure. The operations of the method 1500 may be implemented by a receiving device (e.g., a UE 115 or a network entity 105) or its components as described herein. For example, the operations of the method 1500 may be performed by a receiving device as described with reference to FIGS. 1 through 9. In some examples, a receiving device may execute a set of instructions to control the functional elements of the receiving device to perform the described functions. Additionally, or alternatively, the receiving device may perform aspects of the described functions using special-purpose hardware.

At 1505, the method may include receiving an indication of an intra-symbol duty cycle of a received signal, a first quantity of signal streams being based on the intra-symbol duty cycle, where splitting the received signal into the first quantity of signal streams is based on receiving the indication. The operations of 1505 may be performed in accordance with examples as disclosed herein. In some examples, aspects of the operations of 1505 may be performed by a duty cycle indication component 840 as described with reference to FIG. 8.

At 1510, the method may include splitting the received signal into the first quantity of signal streams, where the first quantity of signal streams is based on the intra-symbol duty cycle of the received signal. The operations of 1510 may be performed in accordance with examples as disclosed herein. In some examples, aspects of the operations of 1510 may be performed by a signal stream component 825 as described with reference to FIG. 8.

At 1515, the method may include performing a Fourier transform operation on each signal stream of the first quantity of signal streams. The operations of 1515 may be performed in accordance with examples as disclosed herein. In some examples, aspects of the operations of 1515 may be performed by a Fourier transform component 830 as described with reference to FIG. 8.

At 1520, the method may include estimating a symbol of the received signal using information from each signal streams of the first quantity of signal streams on which the Fourier transform operation was performed. The operations of 1520 may be performed in accordance with examples as disclosed herein. In some examples, aspects of the operations of 1520 may be performed by a symbol estimation component 835 as described with reference to FIG. 8.

Figure 16:
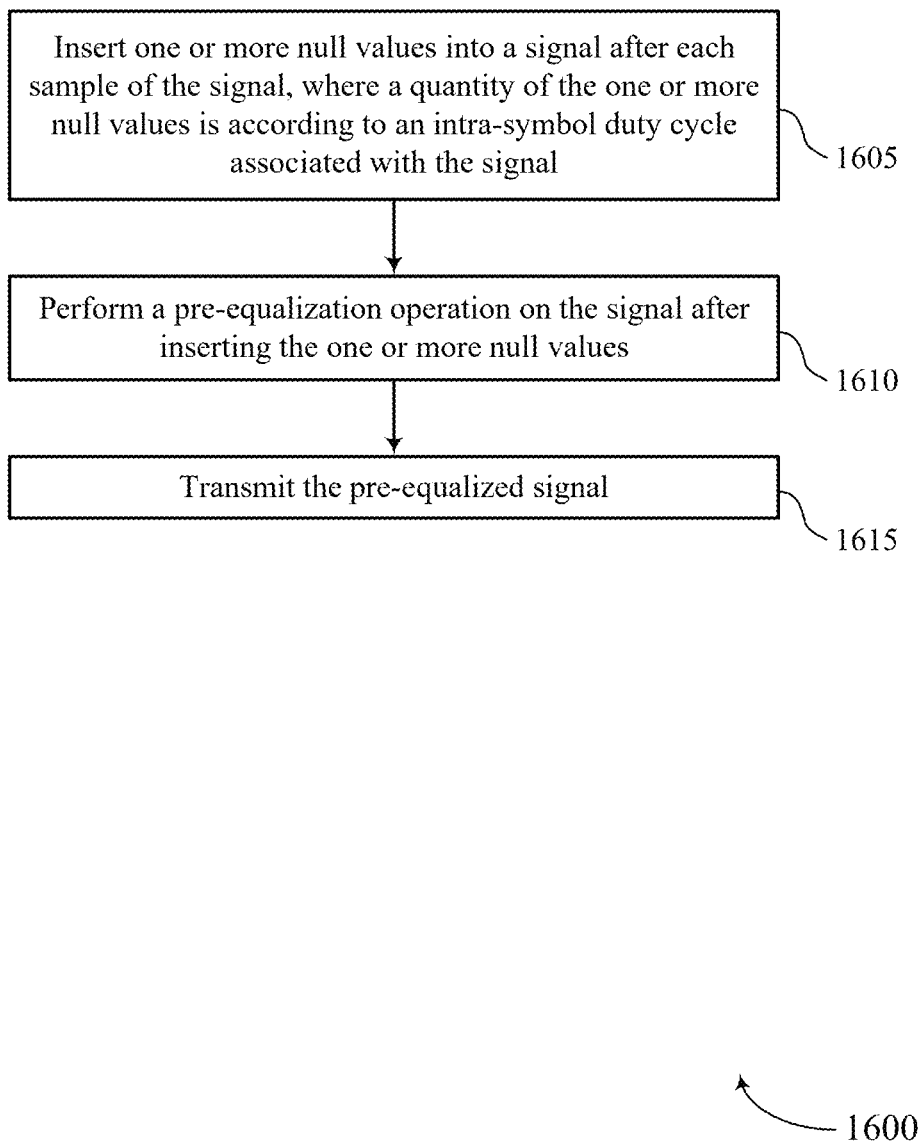

FIG. 16 shows a flowchart illustrating a method 1600 that supports high performance low power link for UWB in accordance with one or more aspects of the present disclosure. The operations of the method 1600 may be implemented by a transmitting device (e.g., a UE 115 or a network entity 105) or its components as described herein. For example, the operations of the method 1600 may be performed by a transmitting device as described with reference to FIGS. 1 through 5 and 10 through 13. In some examples, a transmitting device may execute a set of instructions to control the functional elements of the transmitting device to perform the described functions. Additionally, or alternatively, the transmitting device may perform aspects of the described functions using special-purpose hardware.

At 1605, the method may include inserting one or more null values into a signal after each sample of the signal, where a quantity of the one or more null values is according to an intra-symbol duty cycle associated with the signal. The operations of 1605 may be performed in accordance with examples as disclosed herein. In some examples, aspects of the operations of 1605 may be performed by a null value insertion component 1225 as described with reference to FIG. 12.

At 1610, the method may include performing a pre-equalization operation on the signal after inserting the one or more null values. The operations of 1610 may be performed in accordance with examples as disclosed herein. In some examples, aspects of the operations of 1610 may be performed by a pre-equalization component 1230 as described with reference to FIG. 12.

At 1615, the method may include transmitting the pre-equalized signal. The operations of 1615 may be performed in accordance with examples as disclosed herein. In some examples, aspects of the operations of 1615 may be performed by a signal transmission component 1235 as described with reference to FIG. 12.

The following provides an overview of aspects of the present disclosure:

Aspect 1: A method for wireless communications at a receiving device, comprising: splitting a received signal into a first quantity of signal streams, wherein the first quantity of signal streams is based at least in part on an intra-symbol duty cycle of the received signal; performing a Fourier transform operation on each signal stream of the first quantity of signal streams; and estimating a symbol of the received signal using information from each signal streams of the first quantity of signal streams on which the Fourier transform operation was performed.

Aspect 2: The method of aspect 1, further comprising: receiving an indication of the intra-symbol duty cycle of the received signal, the first quantity of signal streams being based at least in part on the intra-symbol duty cycle, wherein splitting the received signal into the first quantity of signal streams is based at least in part on receiving the indication.

Aspect 3: The method of any of aspects 1 through 2, further comprising: decoding the received signal based at least in part on estimating one or more symbols using the first quantity of signal streams.

Aspect 4: The method of any of aspects 1 through 3, wherein estimating the symbol further comprises: combining outputs of the Fourier transform operation of each signal stream of the first quantity of signal streams; and performing a calculation on the combined outputs using a minimum mean square error (MMSE) estimation process.

Aspect 5: The method of aspect 1, wherein estimating the symbol comprises: performing a set of calculations on outputs of the Fourier transform operation of each signal stream of the first quantity of signal streams, wherein a respective calculation uses an MMSE estimation process and corresponds to each output of each Fourier transform operation; and combining outputs of the set of calculations, wherein estimating the symbol is based at least in part on the combined outputs of the set of calculations.

Aspect 6: The method of any of aspects 1 through 5, further comprising: receiving the received signal using a plurality of ports, wherein each respective port of the plurality of ports corresponds to a respective signal stream.

Aspect 7: The method of any of aspects 1 through 6, wherein each signal stream of the first quantity of signal streams is associated with a respective Fourier transform window.

Aspect 8: The method of any of aspects 1 through 7, further comprising: performing a de-normalization operation on each frequency resource of a plurality of resources associated with the received signal based at least in part on the first quantity of signal streams.

Aspect 9: A method for wireless communications at a transmitting device, comprising: inserting one or more null values into a signal after each sample of the signal, wherein a quantity of the one or more null values is according to an intra-symbol duty cycle associated with the signal; performing a pre-equalization operation on the signal after inserting the one or more null values; and transmitting the pre-equalized signal.

Aspect 10: The method of aspect 9, further comprising: performing a Fourier transform operation on the signal after inserting the one or more null values, wherein performing the pre-equalization operation is based at least in part on performing the Fourier transform operation.

Aspect 11: The method of any of aspects 9 through 10, further comprising: performing a normalization operation to each frequency resource of a plurality of resources associated with the signal based at least in part on performing the pre-equalization operation, wherein the normalization operation is based at least in part on a power threshold associated with the transmitted signal.

Aspect 12: The method of any of aspects 9 through 11, further comprising: performing an inverse Fourier transform operation on the pre-equalized signal after performing the pre-equalization operation; and applying a cyclic prefix to the pre-equalized signal, wherein transmitting the pre-equalized signal is based at least in part on performing the inverse Fourier transform operation and applying the cyclic prefix.

Aspect 13: The method of any of aspects 9 through 12, wherein inserting the one or more null values comprises: inserting the one or more null values in a frequency domain using frequency-domain repetition, wherein the one or more null values are associated with a time domain.

Aspect 14: The method of any of aspects 9 through 13, wherein the pre-equalized signal is transmitted across a plurality of frequency bands.

Aspect 15: The method of aspect 14, wherein a bandwidth of the plurality of frequency bands spans at least 500 MHz.

Aspect 16: The method of any of aspects 9 through 15, further comprising: performing an inverse Fourier transform operation on the signal, wherein inserting the one or more null values is based at least in part on performing the inverse Fourier transform operation.

Aspect 17: The method of any of aspects 9 through 16, further comprising: performing a constellation mapping operation on the signal, wherein inserting the one or more null values is based at least in part on performing the constellation mapping operation.

Aspect 18: The method of any of aspects 9 through 17, further comprising: performing a rate matching operation on the signal, wherein inserting the one or more null values is based at least in part on performing the rate matching operation.

Aspect 19: The method of any of aspects 9 through 18, further comprising: performing a channel encoding operation on the signal, wherein inserting the one or more null values is based at least in part on performing the channel encoding operation.

Aspect 20: A receiving device for wireless communications, comprising one or more memories storing processor-executable code, and one or more processors coupled with the one or more memories and individually or collectively operable to execute the code to cause the receiving device to perform a method of any of aspects 1 through 8.

Aspect 21: A receiving device for wireless communications, comprising at least one means for performing a method of any of aspects 1 through 8.

Aspect 22: A non-transitory computer-readable medium storing code for wireless communications, the code comprising instructions executable by one or more processors to perform a method of any of aspects 1 through 8.

Aspect 23: A transmitting device for wireless communications, comprising one or more memories storing processor-executable code, and one or more processors coupled with the one or more memories and individually or collectively operable to execute the code to cause the transmitting device to perform a method of any of aspects 9 through 19.

Aspect 24: A transmitting device for wireless communications, comprising at least one means for performing a method of any of aspects 9 through 19.

Aspect 25: A non-transitory computer-readable medium storing code for wireless communications, the code comprising instructions executable by one or more processors to perform a method of any of aspects 9 through 19.

It should be noted that the methods described herein describe possible implementations. The operations and the steps may be rearranged or otherwise modified and other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, a graphics processing unit (GPU), a neural processing unit (NPU), an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk, and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database, or another data structure), ascertaining, and the like. Also, "determining" can include receiving (e.g., receiving information), accessing (e.g., accessing data stored in memory), and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label or other subsequent reference label.

The description set forth herein, in connection with the appended drawings, describes example configurations and does not represent all the examples that may be implemented or that are within the scope of the claims. The term "example" used herein means "serving as an example, instance, or illustration" and not "preferred" or "advantageous over other examples." The detailed description includes specific details for the purpose of providing an understanding of the described techniques. These techniques, however, may be practiced without these specific details. In some figures, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A receiving device, comprising:
   one or more memories storing processor-executable code; and
   one or more processors coupled with the one or more memories and individually or collectively operable to execute the code to cause the receiving device to:
      split a received signal into a first quantity of signal streams, wherein the first quantity of signal streams is based at least in part on an intra-symbol duty cycle of the received signal;
      perform a Fourier transform operation on each signal stream of the first quantity of signal streams; and
      estimate a symbol of the received signal using information from each signal streams of the first quantity of signal streams on which the Fourier transform operation was performed.

2. The receiving device of claim 1, wherein the one or more processors are individually or collectively further operable to execute the code to cause the receiving device to:
   receive an indication of the intra-symbol duty cycle of the received signal, the first quantity of signal streams being based at least in part on the intra-symbol duty cycle, wherein splitting the received signal into the first quantity of signal streams is based at least in part on receiving the indication.

3. The receiving device of claim 1, wherein the one or more processors are individually or collectively further operable to execute the code to cause the receiving device to:
   decode the received signal based at least in part on estimating one or more symbols using the first quantity of signal streams.

4. The receiving device of claim 1, wherein, to estimate the symbol, the one or more processors are individually or collectively further operable to execute the code to cause the receiving device to:
   combine outputs of the Fourier transform operation of each signal stream of the first quantity of signal streams; and
   perform a calculation on the combined outputs using a minimum mean square error estimation process.

5. The receiving device of claim 1, wherein, to estimate the symbol, the one or more processors are individually or collectively operable to execute the code to cause the receiving device to:
   perform a set of calculations on outputs of the Fourier transform operation of each signal stream of the first quantity of signal streams, wherein a respective calculation uses a minimum mean square error estimation process and corresponds to each output of each Fourier transform operation; and
   combine outputs of the set of calculations, wherein estimating the symbol is based at least in part on the combined outputs of the set of calculations.

6. The receiving device of claim 1, wherein the one or more processors are individually or collectively further operable to execute the code to cause the receiving device to:
   receive the received signal using a plurality of ports, wherein each respective port of the plurality of ports corresponds to a respective signal stream.

7. The receiving device of claim 1, wherein each signal stream of the first quantity of signal streams is associated with a respective Fourier transform window.

8. The receiving device of claim 1, wherein the one or more processors are individually or collectively further operable to execute the code to cause the receiving device to:
   perform a de-normalization operation on each frequency resource of a plurality of resources associated with the received signal based at least in part on the first quantity of signal streams.

9. A transmitting device, comprising:
   one or more memories storing processor-executable code; and
   one or more processors coupled with the one or more memories and individually or collectively operable to execute the code to cause the transmitting device to:
      insert one or more null values into a signal after each sample of the signal, wherein a quantity of the one or more null values is according to an intra-symbol duty cycle associated with the signal;
      perform a pre-equalization operation on the signal after inserting the one or more null values; and
      transmit the pre-equalized signal.

10. The transmitting device of claim 9, wherein the one or more processors are individually or collectively further operable to execute the code to cause the transmitting device to:

perform a Fourier transform operation on the signal after inserting the one or more null values, wherein performing the pre-equalization operation is based at least in part on performing the Fourier transform operation.

11. The transmitting device of claim 9, wherein the one or more processors are individually or collectively further operable to execute the code to cause the transmitting device to:
perform a normalization operation to each frequency resource of a plurality of resources associated with the signal based at least in part on performing the pre-equalization operation, wherein the normalization operation is based at least in part on a power threshold associated with the transmitted signal.

12. The transmitting device of claim 9, wherein the one or more processors are individually or collectively further operable to execute the code to cause the transmitting device to:
perform an inverse Fourier transform operation on the pre-equalized signal after performing the pre-equalization operation; and
apply a cyclic prefix to the pre-equalized signal, wherein transmitting the pre-equalized signal is based at least in part on performing the inverse Fourier transform operation and applying the cyclic prefix.

13. The transmitting device of claim 9, wherein, to insert the one or more null values, the one or more processors are individually or collectively operable to execute the code to cause the transmitting device to:
insert the one or more null values in a frequency domain using frequency-domain repetition, wherein the one or more null values are associated with a time domain.

14. The transmitting device of claim 9, wherein the pre-equalized signal is transmitted across a plurality of frequency bands.

15. The transmitting device of claim 14, wherein a bandwidth of the plurality of frequency bands spans at least 500 MHz.

16. The transmitting device of claim 9, wherein the one or more processors are individually or collectively further operable to execute the code to cause the transmitting device to:
perform an inverse Fourier transform operation on the signal, wherein inserting the one or more null values is based at least in part on performing the inverse Fourier transform operation.

17. The transmitting device of claim 9, wherein the one or more processors are individually or collectively further operable to execute the code to cause the transmitting device to:
perform a constellation mapping operation on the signal, wherein inserting the one or more null values is based at least in part on performing the constellation mapping operation.

18. The transmitting device of claim 9, wherein the one or more processors are individually or collectively further operable to execute the code to cause the transmitting device to:
perform a rate matching operation on the signal, wherein inserting the one or more null values is based at least in part on performing the rate matching operation.

19. The transmitting device of claim 9, wherein the one or more processors are individually or collectively further operable to execute the code to cause the transmitting device to:
perform a channel encoding operation on the signal, wherein inserting the one or more null values is based at least in part on performing the channel encoding operation.

20. A method for wireless communications at a receiving device, comprising:
splitting a received signal into a first quantity of signal streams, wherein the first quantity of signal streams is based at least in part on an intra-symbol duty cycle of the received signal;
performing a Fourier transform operation on each signal stream of the first quantity of signal streams; and
estimating a symbol of the received signal using information from each signal streams of the first quantity of signal streams on which the Fourier transform operation was performed.

* * * * *